United States Patent
Nomura

(10) Patent No.: US 8,583,754 B2
(45) Date of Patent: Nov. 12, 2013

(54) BUSINESS FLOW DISTRIBUTED PROCESSING SYSTEM AND METHOD

(75) Inventor: Yoshihide Nomura, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 159 days.

(21) Appl. No.: 13/023,118

(22) Filed: Feb. 8, 2011

(65) Prior Publication Data

US 2011/0138007 A1    Jun. 9, 2011

Related U.S. Application Data

(63) Continuation of application No. PCT/JP2008/064628, filed on Aug. 15, 2008.

(51) Int. Cl.
*G06F 15/16* (2006.01)
(52) U.S. Cl.
USPC .......................... 709/208; 709/223; 717/125
(58) Field of Classification Search
USPC ....................................................... 709/208
See application file for complete search history.

(56) References Cited

U.S. PATENT DOCUMENTS

| | | | |
|---|---|---|---|
| 6,493,675 B1 | 12/2002 | Kanaya et al. | |
| 7,487,163 B2 | 2/2009 | Nomura et al. | |
| 2003/0153299 A1* | 8/2003 | Perfit et al. | 455/410 |
| 2004/0117768 A1* | 6/2004 | Chang et al. | 717/125 |
| 2004/0167795 A1 | 8/2004 | Tanaka et al. | |
| 2005/0171833 A1* | 8/2005 | Jost et al. | 705/10 |
| 2006/0136279 A1 | 6/2006 | Maybee et al. | |
| 2009/0052587 A1* | 2/2009 | Song et al. | 375/340 |
| 2009/0164985 A1* | 6/2009 | Balko et al. | 717/162 |
| 2009/0177610 A1 | 7/2009 | Kawamura et al. | |
| 2010/0179784 A1* | 7/2010 | Crosby et al. | 702/117 |
| 2010/0228848 A1* | 9/2010 | Kis | 709/223 |

FOREIGN PATENT DOCUMENTS

| | | |
|---|---|---|
| JP | 08-095874 | 4/1996 |
| JP | 11-213082 | 8/1999 |
| JP | 2004-258823 | 9/2004 |
| JP | 2006-178935 | 7/2006 |

OTHER PUBLICATIONS

Tomotaka Ikawa et al., "A Transaction Model for Workflows on Distributed Independent Active Databases", IEICE Technical Report, vol. 100, No. 228, DE2000-71-90, Jul. 21, 2000, 9 pages.
International Search Report for PCT/JP2008/064628, mailed Sep. 22, 2008.

* cited by examiner

*Primary Examiner* — Hua Fan
(74) *Attorney, Agent, or Firm* — Staas & Halsey LLP

(57) ABSTRACT

This system has plural process servers each having a unit to generate process instances that a series of transaction events are arranged in a time sequence, and a master server that reads out event data from an event data storage unit, and allocates the event data to any one of the plural process servers. Moreover, the master server inquires the holding state of the process instances to the plural process servers, determines a merge destination of the process instance based on replies to the inquiry, and outputs a merge instruction. Then, the process server that is the merge source sends the event data relating to the merge instruction to the merge destination, and the process server of the merge destination receives the event data to merge the received event data to the process instance relating to the merge instruction.

6 Claims, 22 Drawing Sheets

| NO. | EVENT NAME | ID | DATE AND TIME |
|---|---|---|---|
| 1 | RECEIVED ORDER | P01 | 4/1··· |
| 2 | RECEIVED ORDER | P02 | 4/2··· |
| 3 | PRODUCTION | P01 | 4/3··· |
| 4 | DELIVERY | P01 | 4/7··· |
| 5 | PRODUCTION | P02 | 4/8··· |
| 6 | PRODUCTION | P02 | 4/9··· |

BUSINESS FLOW DISTRIBUTED PROCESSING SYSTEM AND METHOD

CROSS-REFERENCE TO RELATED APPLICATIONS

This application is a continuing application, filed under 35 U.S.C. section 111(a), of International Application PCT/JP2008/064628, filed Aug. 15, 2008.

FIELD

This technique relates to a technique for generating a business flow, more specifically to a technique for generating a business flow, while distributing processing to plural servers.

BACKGROUND

For example, a technique has already been known that a business flow is automatically generated by collecting and analyzing data generated in a transaction system used, for example, in a company or the like. According to this technique, it is possible to visualize a flow of the business.

In the conventional art, no configuration that the processing load is distributed is considered, and no configuration exists that each of plural servers distributedly generates process instances, for example.

Therefore, an object of this technique is to enable the plural servers to distributedly generate a complete process instance.

SUMMARY

This business flow distributed processing system has plural process server, each having means for generating a process instance that a series of transaction events are arranged in a time series; and a master server that sequentially reads out event data regarding a transaction event and including an event name, a processing time and an identifier to identify the process instance, from an event data storage unit, and allocates the event data to any one of the plural process servers. Then, the aforementioned master server has means for outputting an inquiry of a holding state of a process instance corresponding to an identifier included in the event data read out from the event data storage unit to the plural process servers; means for receiving a response for the inquiry from the plural process server and judging whether or not plural first process servers holding the process instance relating to the inquiry exist; means for determining a second process server that is a merge destination of the process instance relating to the inquiry, from among the plural first process servers when the plural first process servers exist; and means for outputting a merge instruction including information of the second process server and the identifier of the process instance relating to the inquiry to the first process servers. Furthermore, each of the aforementioned plural process servers has a process instance data storage unit storing the process instance including the event data in association with the identifier of the process instance; means, in response to the inquiry from the master server, for searching the process instance data storage unit for the identifier relating to the inquiry, and replying with presence or absence of the process instance relating to the inquiry to the master server; means for outputting event data relating to the identifier included in the merge instruction to the second process server relating to the merge instruction, when the merge instruction from the master server is received and the process server itself is one of the first process servers other than the second process server; and merge means, in response to receipt of event data from another process server, for merging the received event data to the process instance, which corresponds to the same identifier as the received event data and is stored in the process instance data storage unit.

DESCRIPTION OF EMBODIMENTS

Figure 1:
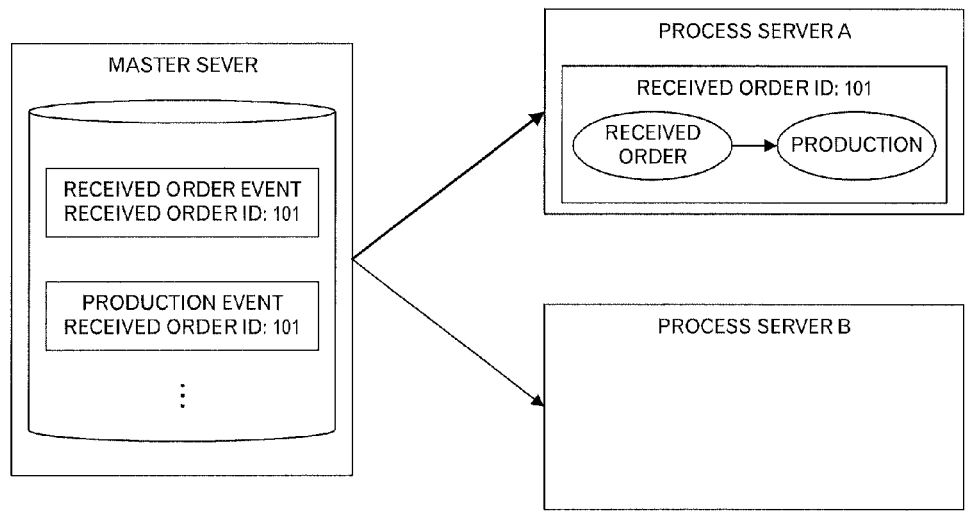
FIG. 1 is a diagram to explain a problem when the processing load of the process server is distributed.
Figure 2:
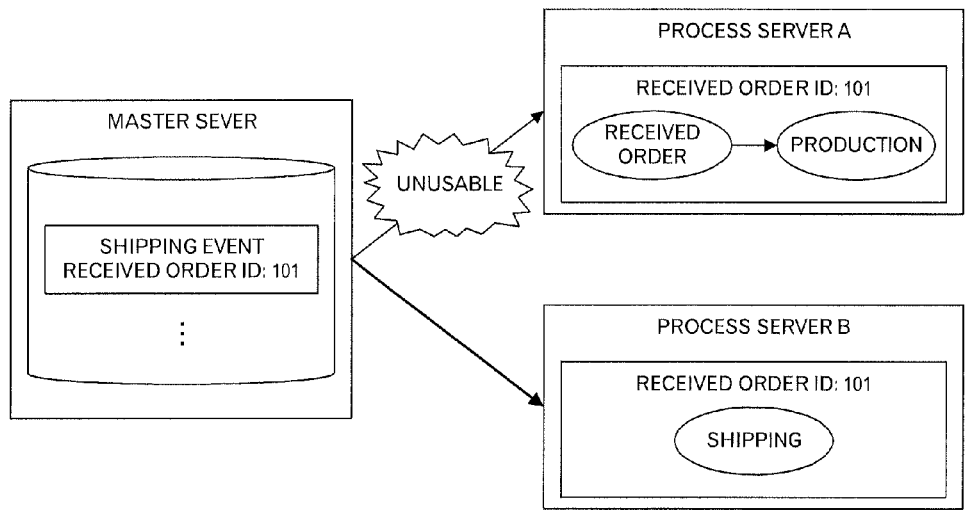
FIG. 2 is a diagram to explain the problem when the processing load of the process server is distributed.

For example, as illustrated in FIG. 1, it is considered that plural process servers (in FIG. 1, process servers A and B) are provided that generate process instances in which a series of transaction events that has been carried out is arranged in a time sequence to distribute the processing loads among the process servers. In such a case, a master server appropriately allocates processing loads to respective process servers according to a predetermined condition. For example, because the process instances are generated using the received order ID as a key in FIG. 1, the master server allocates transaction events (for example, received order, production, shipping and the like) having the same received order ID to a specific process server. However, as illustrated in FIG. 2, when a trouble occurs in a process server, for example, and the process server is temporarily unusable, transaction events having the same received order ID are dispersed to plural process servers, and a complete process instance (in the example of FIG. 2, "Received Order"-"Production"-"Shipping") cannot be generated.

Figures 3, 5:
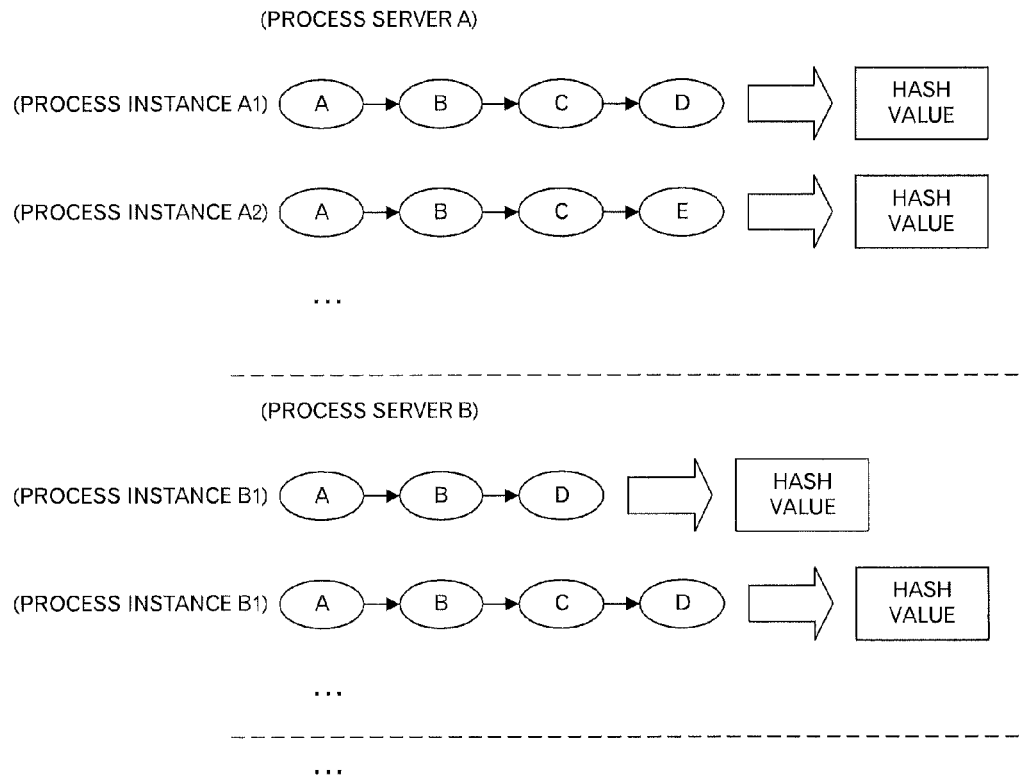
FIG. 3 is a diagram to explain a processing when totaling the number of process instances.
FIG. 5 is a diagram depicting an example of data stored in an event data storage unit.

On the other hand, for example, the number of occurrences of the process instances is totaled in the analysis of the business flow or the like. Incidentally, when determining the identity of the process instance, it takes times to compare the arrangements of the transaction events between the process instances. Therefore, as illustrated in FIG. 3, a hash value is calculated for each process instance, and the identity of process instances is determined according to the hash value. This is because the calculated hash values also become identical, when the arrangements of the transaction events in the process instances are the same. However, as described above, a complete process instance cannot be generated. Therefore, it may not be possible to obtain the correct totaled value.

Figure 4:
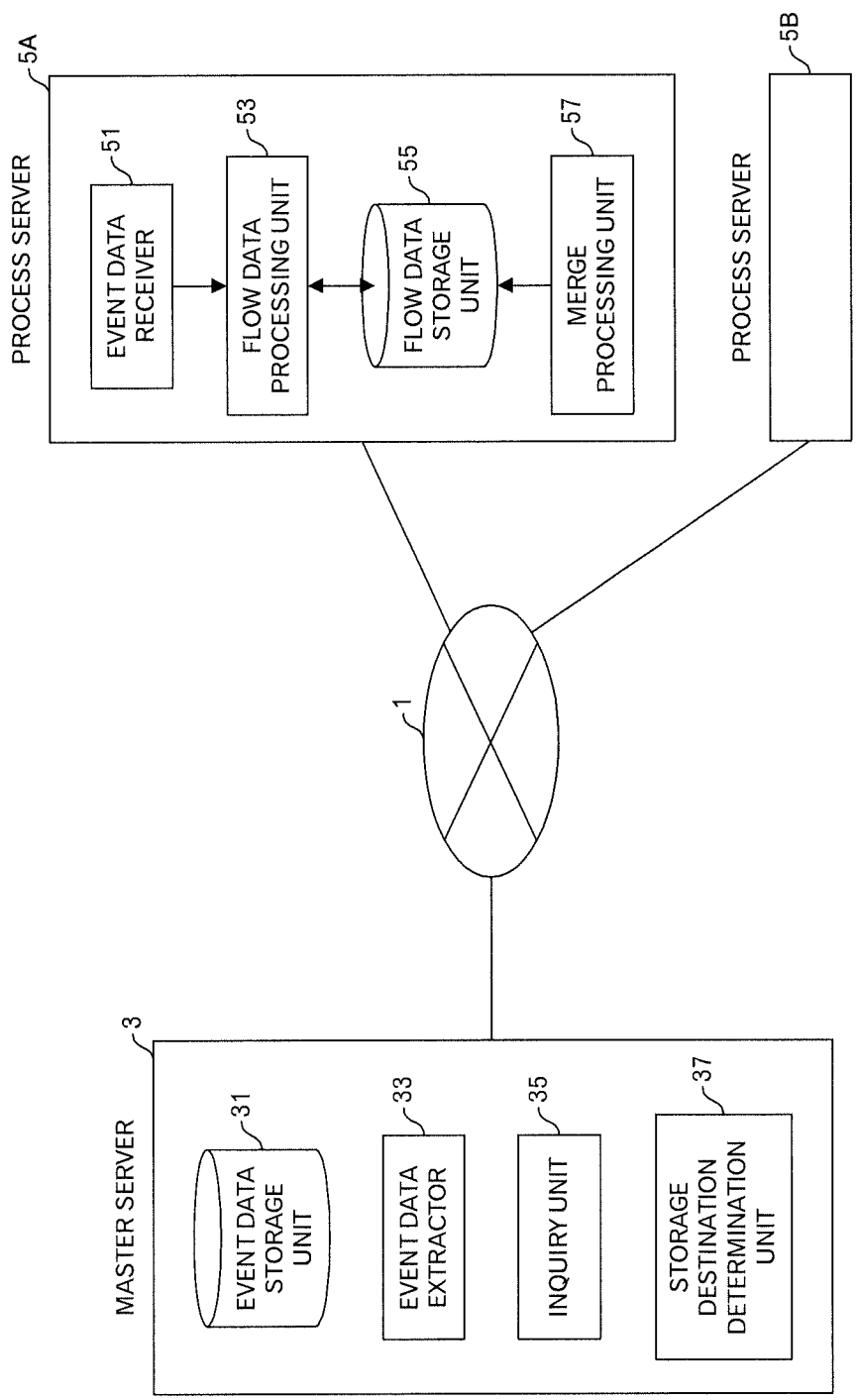
FIG. 4 is a diagram depicting an outline of a business flow distributed processing system relating to an embodiment.

Then, in this embodiment, a configuration as illustrated in FIG. 4 is employed. In the following, the business flow distributed processing system of an embodiment of this technique will be explained. In FIG. 4, for example, a master server 3 and plural process servers 5 (5A and 5B in FIG. 4) are connected to a network such as an in-house LAN (Local Area Network). It is not illustrated in the figure, however, a transaction system is also connected to the network.

The master server 3 has an event data storage unit 31 storing event data relating to a transaction event carried out in the transaction system; an invent data extractor 33 that extracts the event data from the event data storage unit 31 at periodic or arbitrary timing; an inquiry unit 35 that makes an inquiry to each process server 5, regarding the holding status of the process instances (hereafter, may also be called flow data) and acquires hash values; and a storage destination determination unit 37 that carries out a processing such as determining the transmission destination of the event data extracted by the event data extractor 33.

The process server 5A has: an event data receiver 51 that receives the event data from that master server 3; a flow data processing unit 53 that carries out a processing such as generating flow data; a flow data storage unit 55 that stores the flow data that is generated by the flow data processing unit 53; and a merge processing unit 57 that merges the flow data. It is not illustrated in FIG. 4, however, a process server 5B also has the same configuration as the process server 5A.

An example of data stored in the event data storage unit is illustrated in FIG. 5. In the example in FIG. 5, a column of a record number (No.), a column of an event name, a column of an identifier (ID) for identifying a process instance, and a column of processing date and time are included in the event data storage unit 31. Data that were collected from the transaction system (not illustrated in the figure) are registered in the event data storage unit 31. The collection processing itself is not an important part of the present technique, so will not be described more than the description above.

Figure 6:
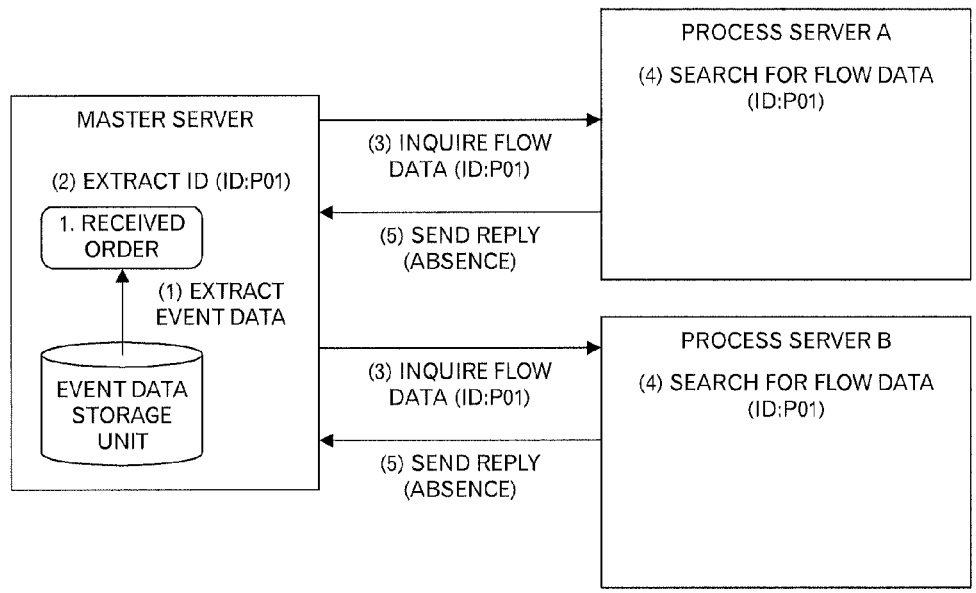
FIG. 6 is a diagram to explain an overall flow in the business flow distributed processing system relating to the embodiment.

Next, the entire processing flow of the business flow distributed processing system illustrated in FIG. 4 will be explained using FIG. 6 to FIG. 18. Incidentally, it is assumed that data such as illustrated in FIG. 5 is stored in the event data storage unit 31. In addition, for convenience of the explanation, an example is explained in which there are two process servers 5 (i.e. process server 5A and 5B), however, the same processing is basically carried out in the case of three or more process servers. First, the event data extractor 33 of the master server 3 extracts unprocessed event data from the event data storage unit 31 at periodic or arbitrary timing (FIG. 6: step (1)). Here, event data (whose event name is "Received Order" and whose ID is "P01") of record No. 1 (FIG. 5) is extracted. Then, the inquiry unit 35 of the master server 3 extracts the ID (P01) from the event data (step (2)) and outputs an inquiry about the holding status of the flow data relating to the ID (P01) to the process servers 5A and 5B (step (3)).

Then, the flow data processing units 53 of the process servers 5A and 5B respectively receive the inquiry about the holding status of the flow data relating to the ID (P01) from the master server 3, and search the flow data storage unit 55 using the ID (P01) relating to the inquiry (step (4)). Then, the respective flow data processing units 53 of the process servers 5A and 5B reply with data representing whether or not the flow data relating to the ID (P01) is held (step (5)). Incidentally, here, because there is no flow data relating to the ID (P01) in either process server 5A or process server 5B, the flow data processing units 53 reply that flow data is not held. Then, the inquiry unit 35 of the master server 3 receives the reply to the inquiry from the process servers 5A and 5B.

Figure 7:
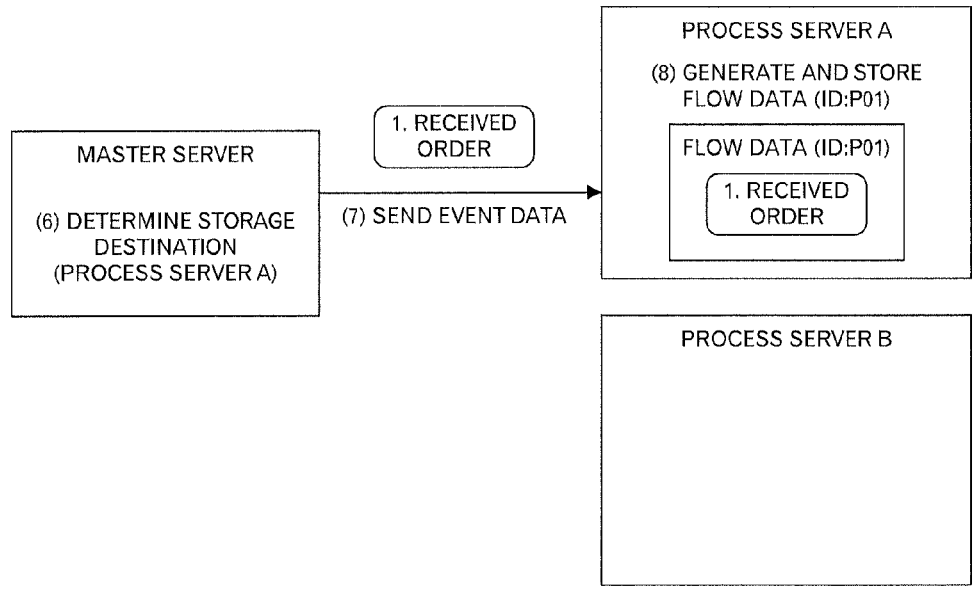
FIG. 7 is a diagram to explain the overall flow in the business flow distributed processing system relating to the embodiment.

Shifting to the explanation of FIG. 7, the storage destination determination unit 37 of the master server 3 determines the transmission destination of the event data (FIG. 7: step (6)). Incidentally, details will be explained later, however, when there is no process server 5 that holds the flow data relating to the inquiry, the storage destination determination unit 37 determines the transmission destination of the event data from among all of the process servers 5. Moreover, when there is one process server 5 that holds the flow data relating to the inquiry, the storage destination determination unit 37 determines that process server 5 as the transmission destination of the event data. Furthermore, when there are plural process servers 5 that hold the flow data relating to the inquiry, the storage destination determination unit 37 determines a merge destination of the flow data from among the process servers 5 that hold that flow data. Incidentally, here, the process server 5A is determined as the transmission destination. Then, the storage destination determination unit 37 of the master server 3 transmits the event data (whose event name is "Received Order" and whose ID is "P01") to the process server 5A (step (7)). The flow data processing unit 53 of the process server 5A receives the event data from the master server 3. Then, the flow data processing unit 53 also generates flow data that includes that event data, and stores that flow data into the flow data storage unit 55 (step (8)).

Figure 8:
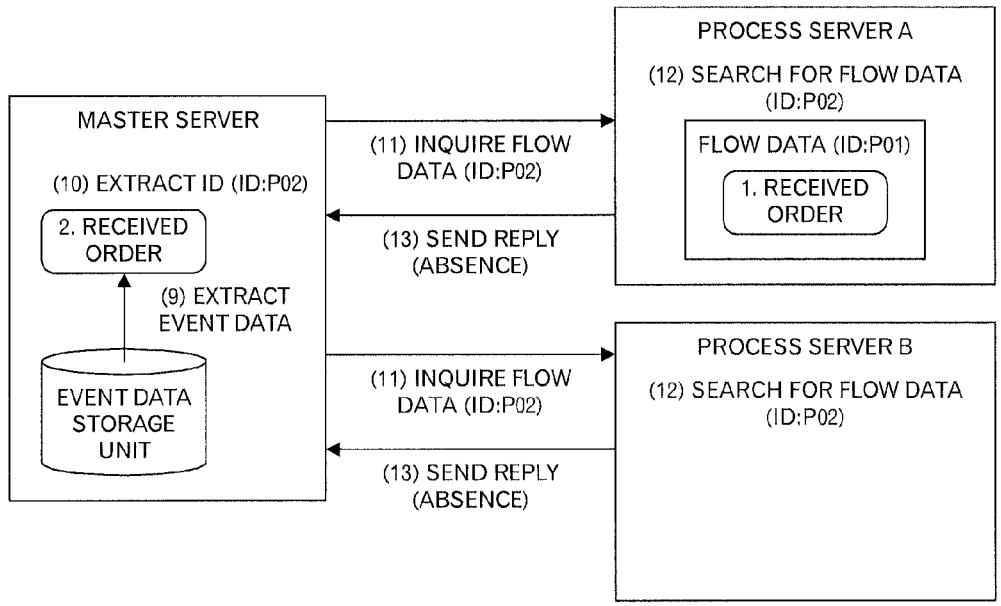
FIG. 8 is a diagram to explain the overall flow in the business flow distributed processing system relating to the embodiment.

Shifting to explanation of FIG. 8, the event data extractor 33 of the master server 3 extracts the next event data from the event data storage unit 31 (FIG. 8: step (9)). Here, the event data (whose event name is "Received Order" and whose ID is "P02") of record No. 2 (FIG. 5) is extracted. Then, the inquiry unit 35 of the master server 3 extracts the ID (P02) from the event data (step (10)), and outputs an inquiry about the holding status of the flow data relating to that ID (P02) to the process servers 5A and 5B (step (11)).

Then, the flow data processing units 53 of the process servers 5A and 5B respectively receive, from the master server 3, the inquiry about the holding status of the flow data relating to the ID (P02), and search the flow data storage unit 55 using the ID (P02) relating to that inquiry (step (12)). Then, the flow data processing units 53 of the process servers 5A and 5B respectively reply with data representing whether or not the flow data relating to the ID (P02) is held (step (13)). Incidentally, here, because neither process server 5A nor process server 5B hold the flow data relating to the ID (P02), the flow data processing units 53 reply that flow data is not held. Then, the inquiry unit 35 of the master server 3 receives replies to the inquiry from the process servers 5A and 5B.

Figure 9:
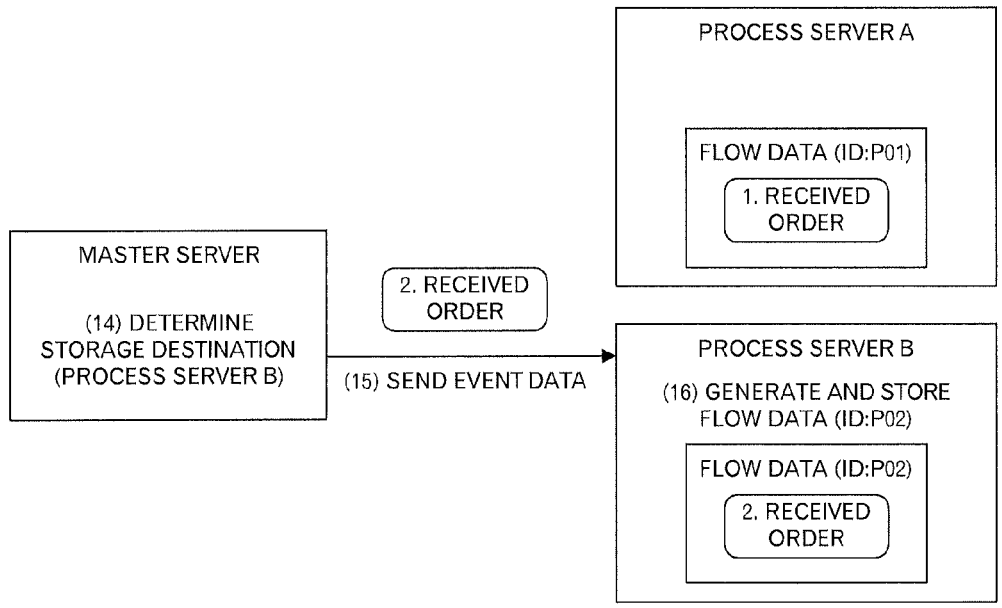
FIG. 9 is a diagram to explain the overall flow in the business flow distributed processing system relating to the embodiment.

Shifting to explanation of FIG. 9, the storage destination determination unit 37 of the master server 3 determines the transmission destination of the event data (FIG. 9: step (14)). Here, the process server 5B is determined as the transmission destination. Then, the storage destination determination unit 37 of the master server 3 transmits the event data (whose event name is "Received Order" and whose ID is "P02") to the process server 5B (step (15)). The flow data processing unit 53 of the process server 5B receives the event data from the master server 3. Then, the flow data processing unit 53 generates the flow data that includes that event data and stores that flow data into the flow data storage unit 55 (step (16)).

Figure 10:
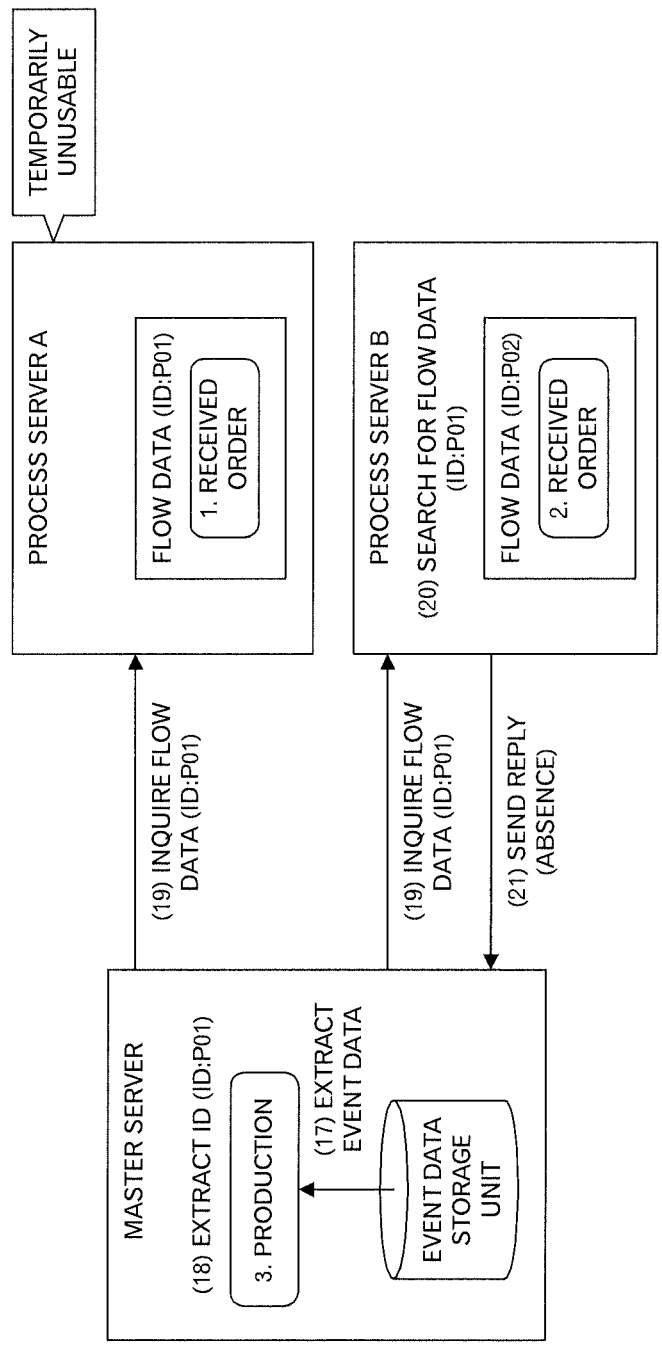
FIG. 10 is a diagram to explain the overall flow in the business flow distributed processing system relating to the embodiment.

Shifting to explanation of FIG. 10, the event data extractor 33 of the master server 3 extracts the next event data from the event data storage unit 31 (FIG. 10; step (17)). Here, the event data (whose event name is "Production" and whose ID is "P01") of record No. 3 (FIG. 5) is extracted. Then, the inquiry unit 35 of the master server 3 extracts the ID (P01) from the event data (step (18)), and outputs an inquiry about the holding status of the flow data relating to the ID (P01) to the process servers 5A and 5B (step (19)). Incidentally, at the time of the step (19), the process server 5A is temporarily in an unusable state (for example, any trouble has occurred).

Then, the flow data processing unit 53 of the process server 5B receives, from the master server 3, the inquiry about the holding status of the flow data relating to the ID (P01), and searches the flow data storage unit 55 for the ID (P01) relating to the inquiry (step (20)). Then, the flow data processing unit 53 of the process server 5B replies with data representing whether or not the flow data relating to the ID (P01) is held (step (21)). Here, because the process server 5B does not hold the flow data relating to the ID (P01), the process server 5B replies that the flow data is not held. Incidentally, because the process server 5A is temporarily unusable, there is no reply from the process server 5A. Then, the inquiry unit 35 of the master server 3 receives a reply to the inquiry from process server 5B.

Figure 11:
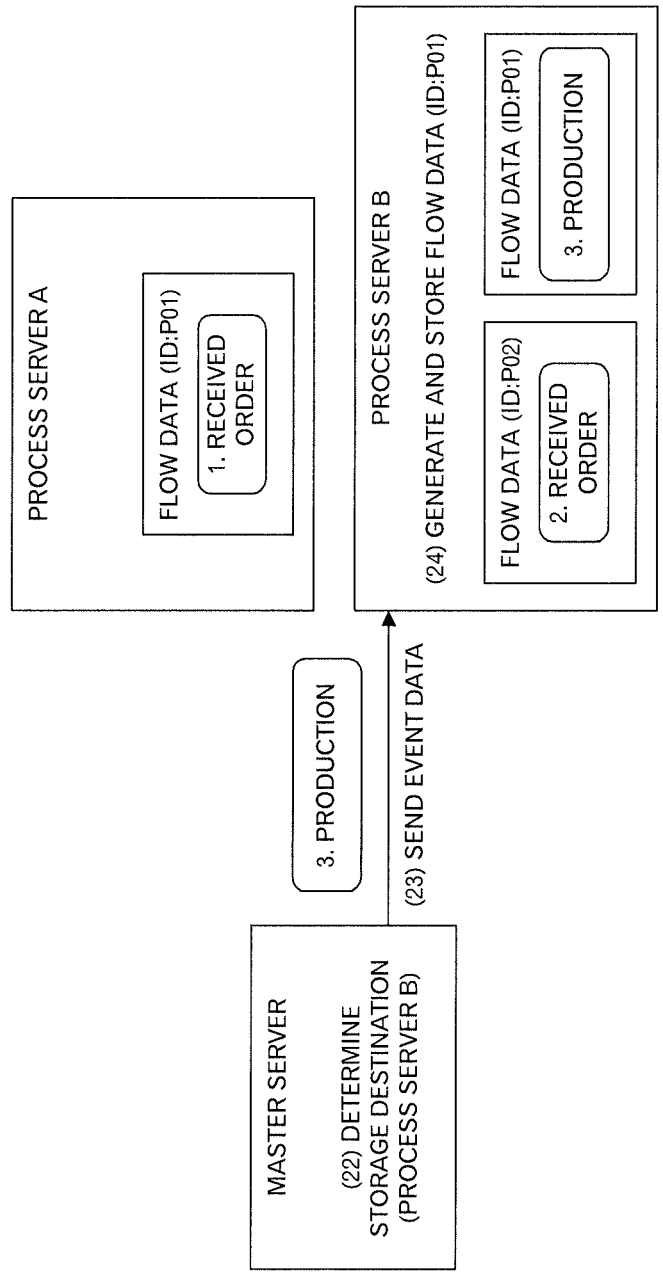
FIG. 11 is a diagram to explain the overall flow in the business flow distributed processing system relating to the embodiment.

Shifting to explanation of FIG. 11, the storage destination determination unit 37 of the master server 3 determines the transmission destination of the event data (FIG. 11: step (22)). Here, it is assumed that the process server 5B is determined as the transmission destination. Then, the storage destination determination unit 37 of the master server 3 transmits the event data (whose event name is "Production" whose ID is "P01") to the process server 5B (step (23)). The flow data processing unit 53 of the process server 5B receives the event data from the master server 3. Then, the flow data processing unit 53 generates flow data that includes that event data, and stores the flow data into the flow data storage unit 55 (step (24)). In other words, the flow data relating to the ID (P01) is distributedly stored into both of the process servers 5A and 5B.

Figure 12:
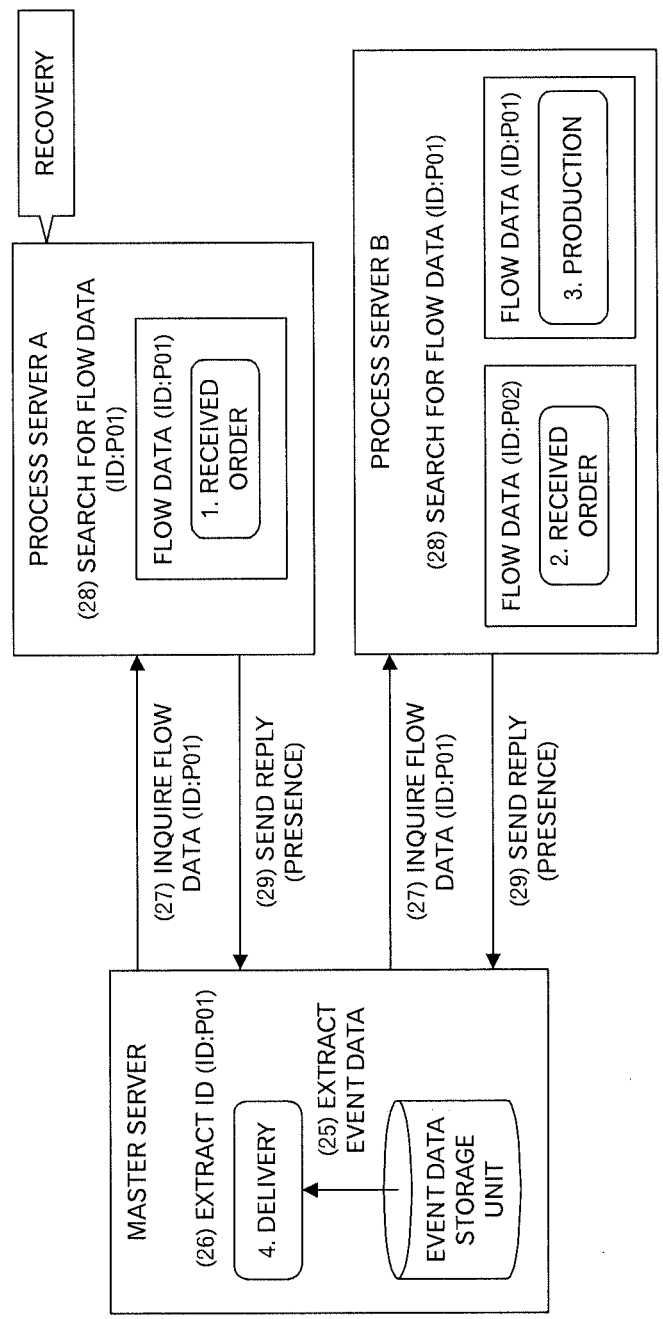
FIG. 12 is a diagram to explain the overall flow in the business flow distributed processing system relating to the embodiment.

Shifting to explanation of FIG. 12, the event data extractor 33 of the master server 3 extracts the next event data from the event data storage unit 31 (FIG. 12: step (25)). Here, the event data (whose event name is "Delivery" and whose ID is "P01") of record No. 4 (FIG. 5) is extracted. Then, the inquiry unit 35 of the master server 3 extracts the ID (P01) from the event data (step (26)), and outputs an inquiry about the holding status of the flow data relating to the ID (P01) to the process servers 5A and 5B (step (27)). Incidentally, at the time of the step (27), it is assumed that the process server 5A is restored to a usable state.

Then, the flow data processing units 53 of the process servers 5A and 5B respectively receive, from the master server 3, the inquiry about the holding status of the flow data relating to the ID (P01), and search the flow data storage unit 55 for the ID (P01) relating to the inquiry (step (28)). Then, the flow data processing units 53 of the process servers 5A and 5B respectively reply with data representing whether or not the flow data relating to the ID (P01) is held (step (29)). Here, because both of the process server 5A and process server 5B hold the flow data relating to the ID (P01), the process servers 5A and 5B reply that the flow data is held. Then, the inquiry unit 35 of the master server 3 receives the reply to the inquiry from the process servers 5A and 5B.

Figure 13:
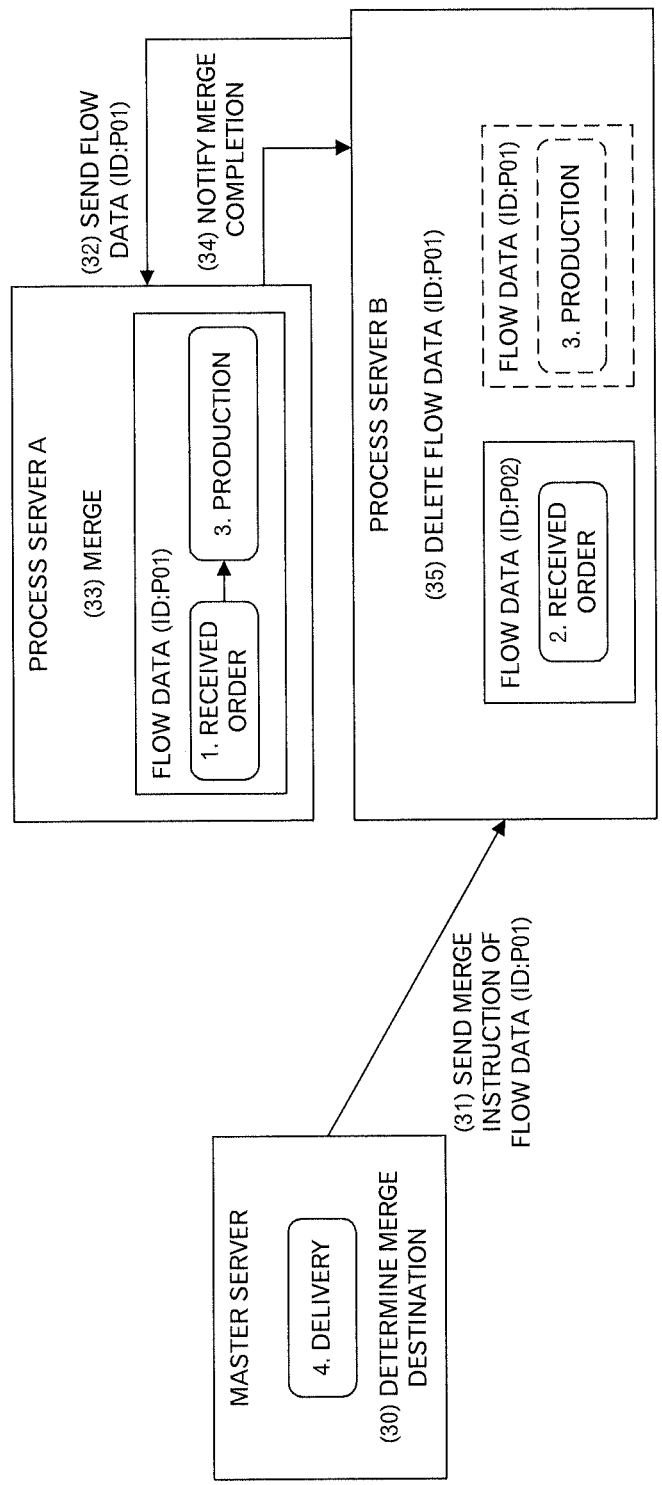
FIG. 13 is a diagram to explain the overall flow in the business flow distributed processing system relating to the embodiment.

Shifting to explanation of FIG. 13, the storage destination determination unit 37 of the master server 3 determines a merge destination of the flow data (FIG. 13: step (30)). Here, it is assumed that the process server 5A is determined as the merge destination. Then, the storage destination determination unit 37 of the master server 3 transmits a merge instruction of the flow data relating to the ID (P01) to the process server 5B (step (31)). Incidentally, the merge instruction includes the ID and information concerning the process server 5 that is the merge destination. The merge processing unit 57 of the process server 5B receives the merge instruction from the master server 3. Then, the merge processing unit 57 of the process server 5B reads out the flow data relating to the ID (P01) that is included in the merge instruction from the flow data storage unit 55, and transmits that flow data to the process server 5A (step (32)). Incidentally, the event data relating to the ID (P01) may be sent, instead of the flow data.

Then, the merge processing unit 57 of the process server 5A receives the flow data (or event data) relating to the ID (P01) from the process server 5B, and merges the received flow data with the flow data that the process server 5A itself holds (step (33)). Then, the merge processing unit 57 of the process server 5A transmits a merge completion notification to the process server 5B (step (34)).

Then, the merge processing unit 57 of the process server 5B receives the merge completion notification from the process server 5A and deletes the flow data (or event data) relating to the ID (P01) from the flow data storage unit 55 (step (35)). In other words, a state is realized where the flow data relating to the ID (P01) is held only in the process server 5A.

Figure 14:
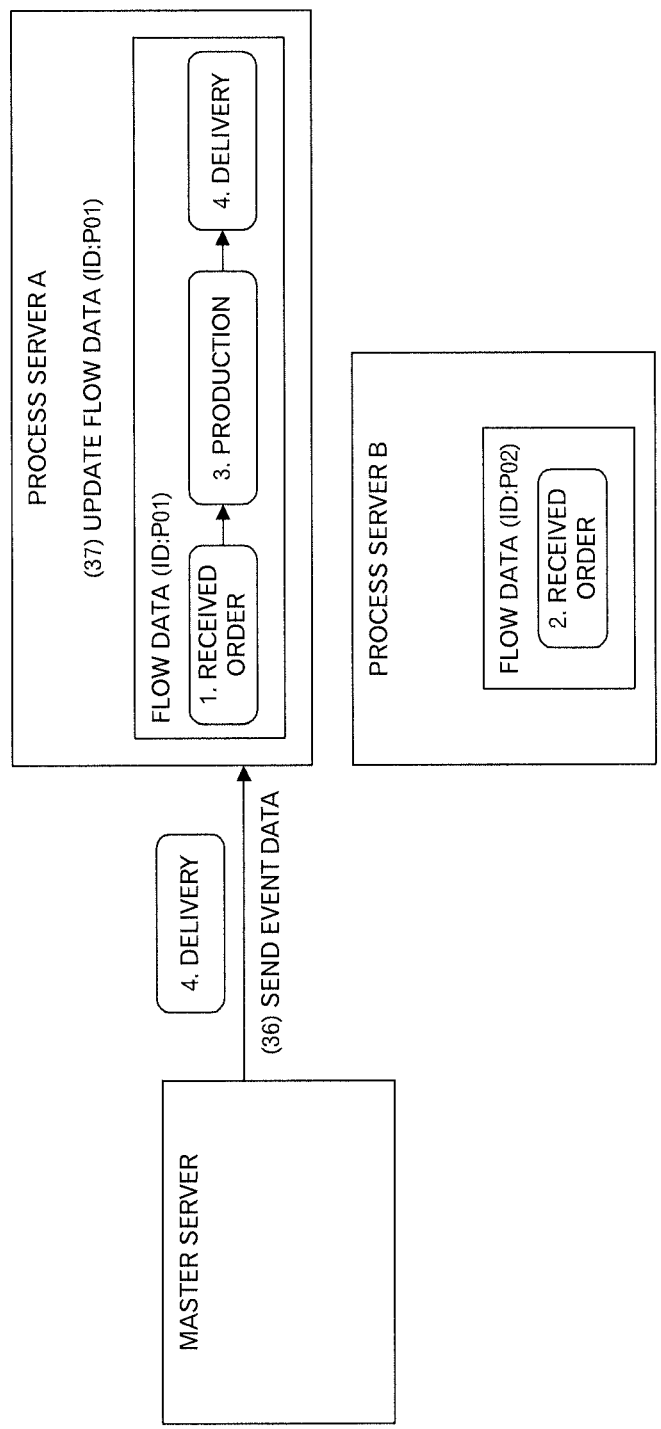
FIG. 14 is a diagram to explain the overall flow in the business flow distributed processing system relating to the embodiment.

Shifting to an explanation of FIG. 14, the storage destination determination unit 37 of the master server 3 transmits the event data (whose event name is "Delivery" and whose ID is "P01") that was extracted at the step (25) to the process server 5A (FIG. 14: step (36)). Then, the flow data processing unit 53 of the process server 5A receives the event data from the master server 3 to update the flow data relating to the ID (P01) (step (37)). More specifically, the transaction event of that event data is added to the flow data relating to the ID (P01).

Figure 15:
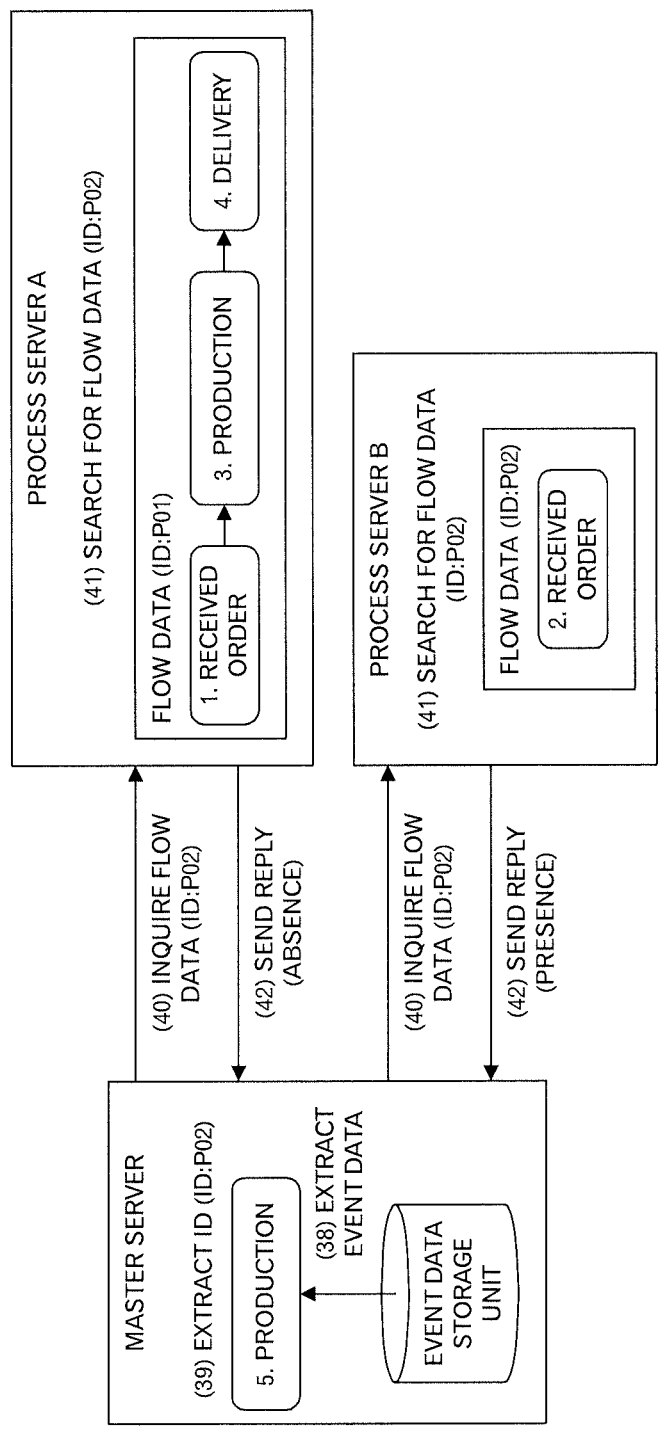
FIG. 15 is a diagram to explain the overall flow in the business flow distributed processing system relating to the embodiment.

Shifting to explanation of FIG. 15, the event data extractor 33 of the master server 3 extracts the next event data from the event data storage unit 31 (FIG. 15: step (38)). Here, the event data (whose event name is "Production" and whose ID is "P02") of record No. 5 (FIG. 5) is extracted. The inquiry unit 35 of the master server 3 extracts the ID (P02) from the event data (step (39)), and outputs an inquiry about the holding status of the flow data relating to the ID (P02) to the process servers 5A and 5B (step (40)).

Then, the flow data processing units 53 of the process servers 5A and 5B respectively receive, from the master server 3, the inquiry about the holding status of the flow data relating to the ID (P02), and search the flow data storage unit 55 using the ID (P02) relating to the inquiry (step (41)). Then, the flow data processing units 53 of the process servers 5A and 5B respectively reply with data representing whether or not the flow data relating to the ID (P02) is held (step (42)). Here, because the process server 5A does not hold the flow data relating to the ID (P02), the process server 5A replies that the flow data is not held. On the other hand, because the process server 5B stores the flow data relating to the ID (P02), the process server 5B replies that the flow data is held. Then, the inquiry unit 35 of the master server 3 receives replies to the inquiry from the process servers 5A and 5B.

Figure 16:
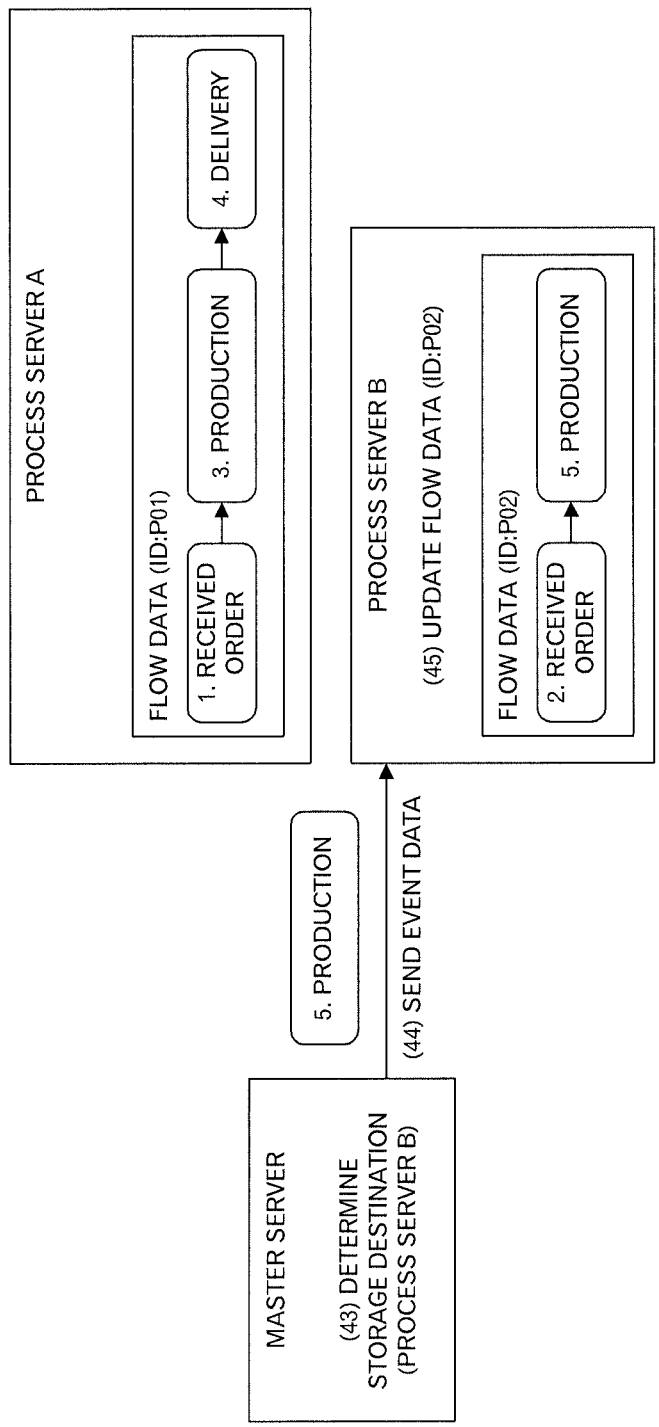
FIG. 16 is a diagram to explain the overall flow in the business flow distributed processing system relating to the embodiment.

Shifting to an explanation of FIG. 16, the storage destination determination unit 37 of the master server 3 determines the transmission destination of the event data (FIG. 16: step (43)). Incidentally, because only the process server 5B holds the flow data relating to the ID (P02), the process server 5B is determined as the transmission destination. Then, the storage destination determination unit 37 of the master server 3 transmits the event data (whose event name is "Production" and whose ID is "P02") to the process server 5B (step (44)). The flow data processing unit 53 of process server 5B receives the event data from the master server 3, and updates the flow data relating to the ID (P02) (step (45)). More specifically, the transaction event of that event data is added to the flow data relating to the ID (P02).

Figure 17:
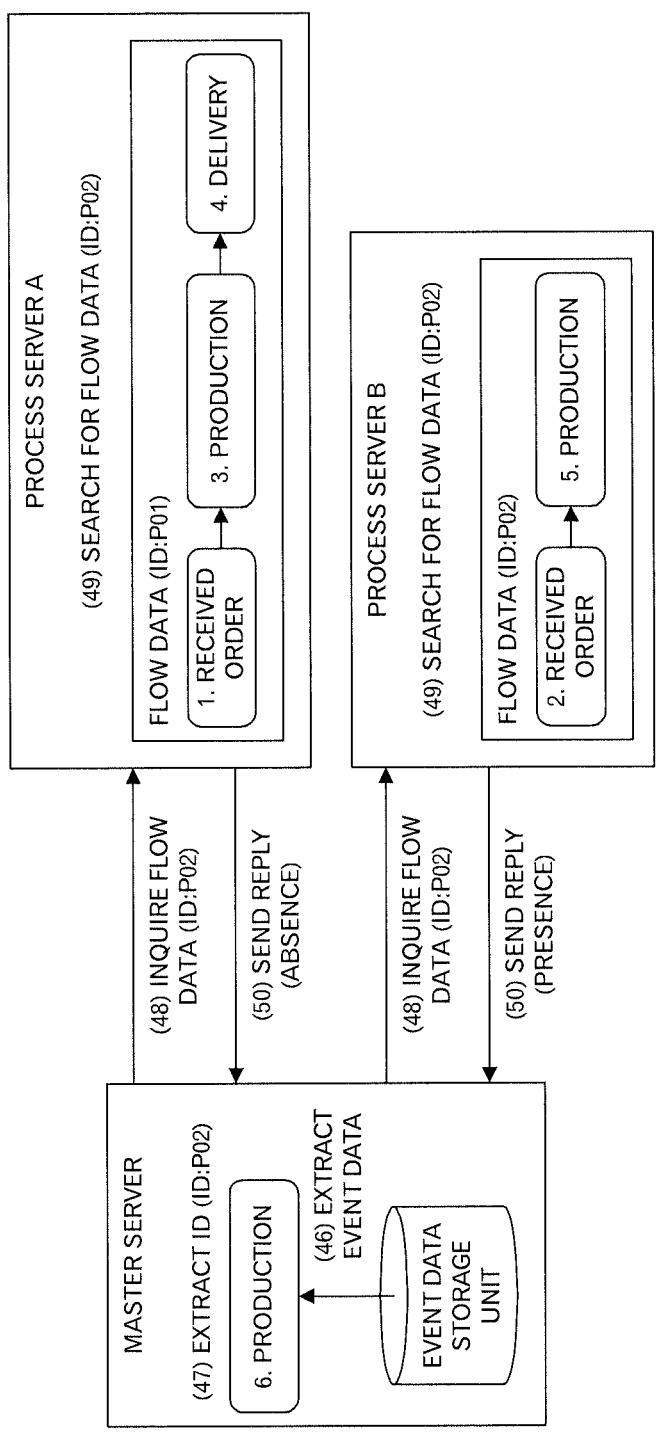
FIG. 17 is a diagram to explain the overall flow in the business flow distributed processing system relating to the embodiment.

Shifting to explanation of FIG. 17, the event data extractor 33 of the master server 3 extracts the next event data from the event data storage unit 31 (FIG. 17: step (46)). Here, the event data (whose event name is "Production" and whose ID is "P02") of record No. 6 is extracted. The inquiry unit 35 of the master server 3 extracts the ID (P02) from the event data and outputs an inquiry about the holding status of the flow data relating to the ID (P02) to the process servers 5A and 5B (step (48)).

Then, the flow data processing units 53 of the process servers 5A and 5B respectively receive the inquiry from the master server 3 about the holding status of flow data relating to the ID (P02), and search the flow data storage unit 55 using the ID (P02) relating to the inquiry (step (49)). Then, the respective flow data processing units 53 of the process servers 5A and 5B respectively reply with data representing whether or not the flow data relating to the ID (P02) is held (step (50)). Here, because the process server 5A does not hold the flow data relating to the ID (P02), the process server 5A replies that the flow data is not held. On the other hand, because the process server 5B holds the flow data relating to the ID (P02), the process server 5B replies that the flow data is held. The inquiry unit 35 of the master server receives the replies to the inquiry from the process servers 5A and 5B.

Figure 18:
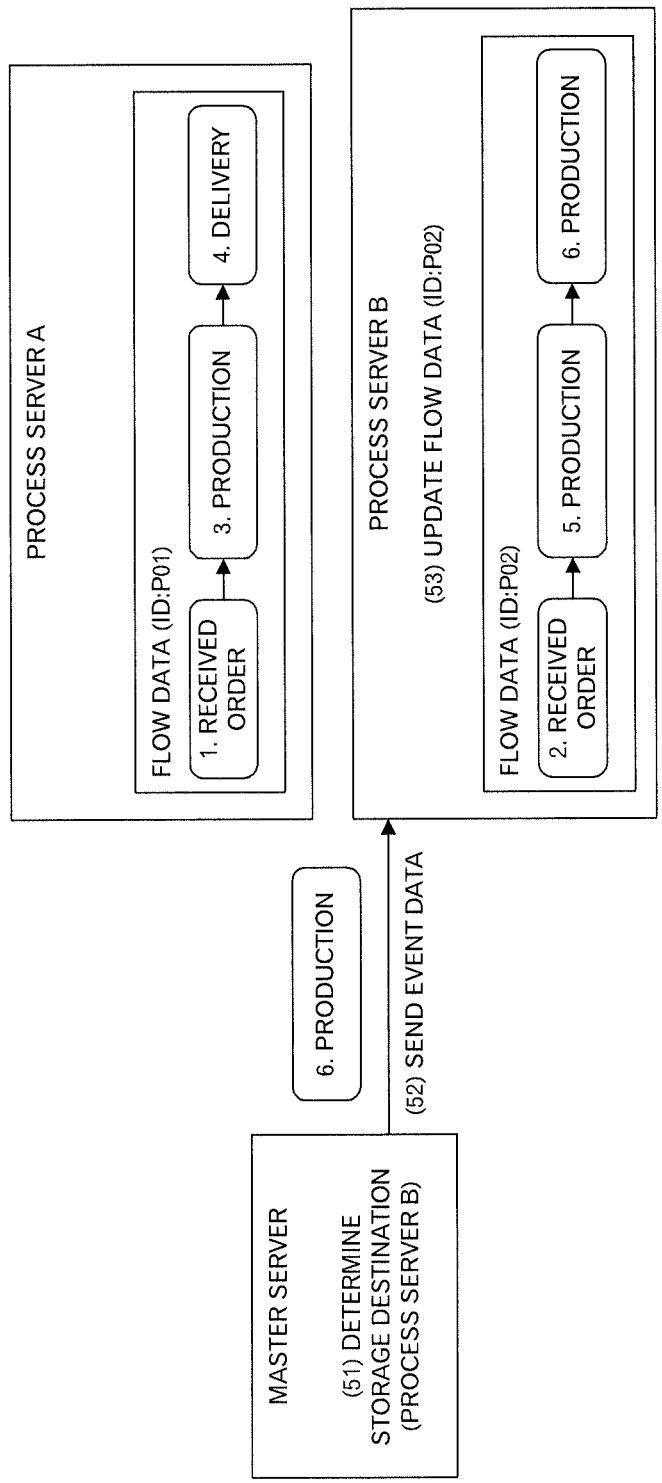
FIG. 18 a diagram to explain the overall flow in the business flow distributed processing system relating to the embodiment.

Shifting to explanation of FIG. 18, the storage destination determination unit 37 of the master server 3 determines the transmission destination of the event data (FIG. 18: step (51)). Incidentally, because only the process server 5B holds the flow data relating to the ID (P02), the process server 5B is determined as the transmission destination. Then, the storage destination determination unit 37 of the master server 3 transmits the event data (whose event name is "Production" and whose ID is "P02") to the process server 5B (step (52)). The flow data processing unit 53 of the process server 5B receives the event data from the master server 3 and updates the flow data relating to the ID (P02) (step (53)). More specifically, the transaction event of that event data is added to the flow data relating to the ID (P02). Then, the process servers 5A and 5B respectively calculate hash values for each flow data. Incidentally, the process servers 5A and 5B, for example, may respectively transmit the hash values for the flow data to the master server 3 in response to a request from the master server 3.

Thus, in this business flow distributed processing system, even though, for some reasons, transaction events having the same ID are dispersed among plural process servers 5, the flow data relating to the events dispersively held is automatically merged afterwards. Therefore, as a result, it is possible to distributedly generate complete process instances by plural process servers 5. In addition, it is possible to determine the identity between process instances by hash values, and thus obtain correct totaled results.

By carrying out the processes as described above, even though, for some reasons, the transaction events having the same ID are dispersed among plural process servers 5, the flow data relating to the events dispersively held is automatically merged afterwards. Therefore, as a result, it is possible to distributedly generate complete process instances by each of the plural process servers 5.

Figure 19:
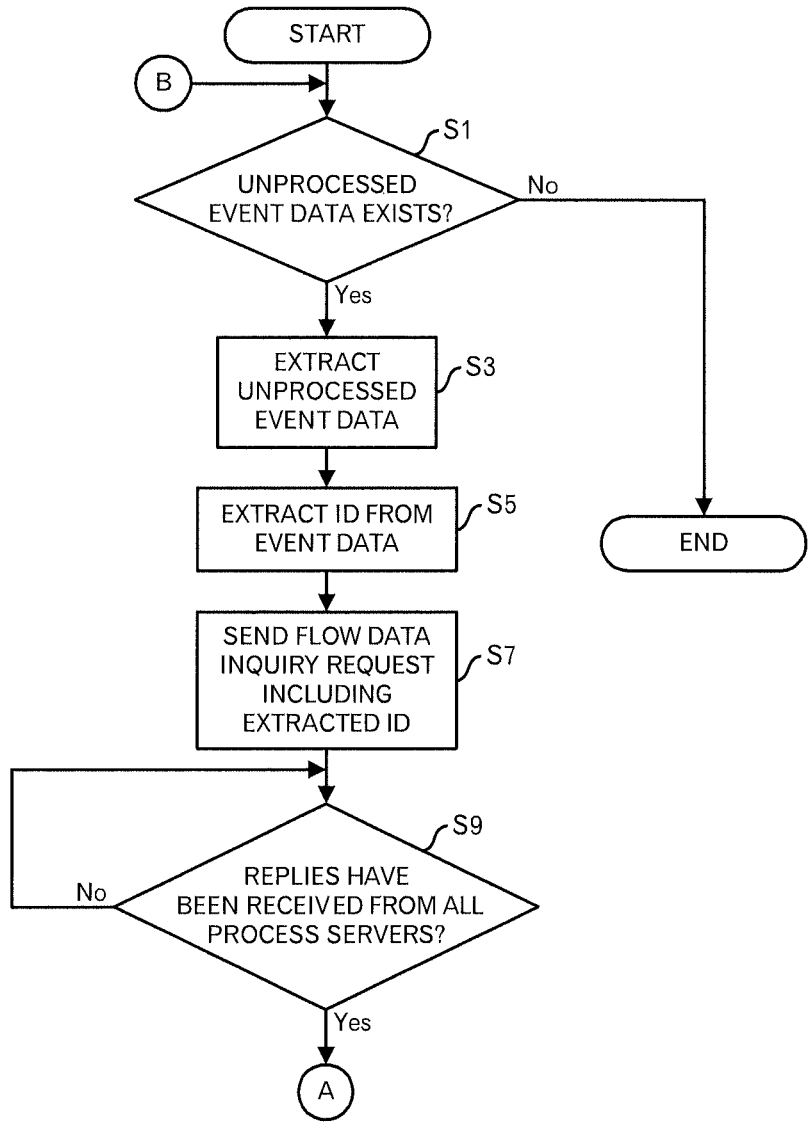
FIG. 19 is a diagram depicting a processing flow of a master server.
Figure 20:
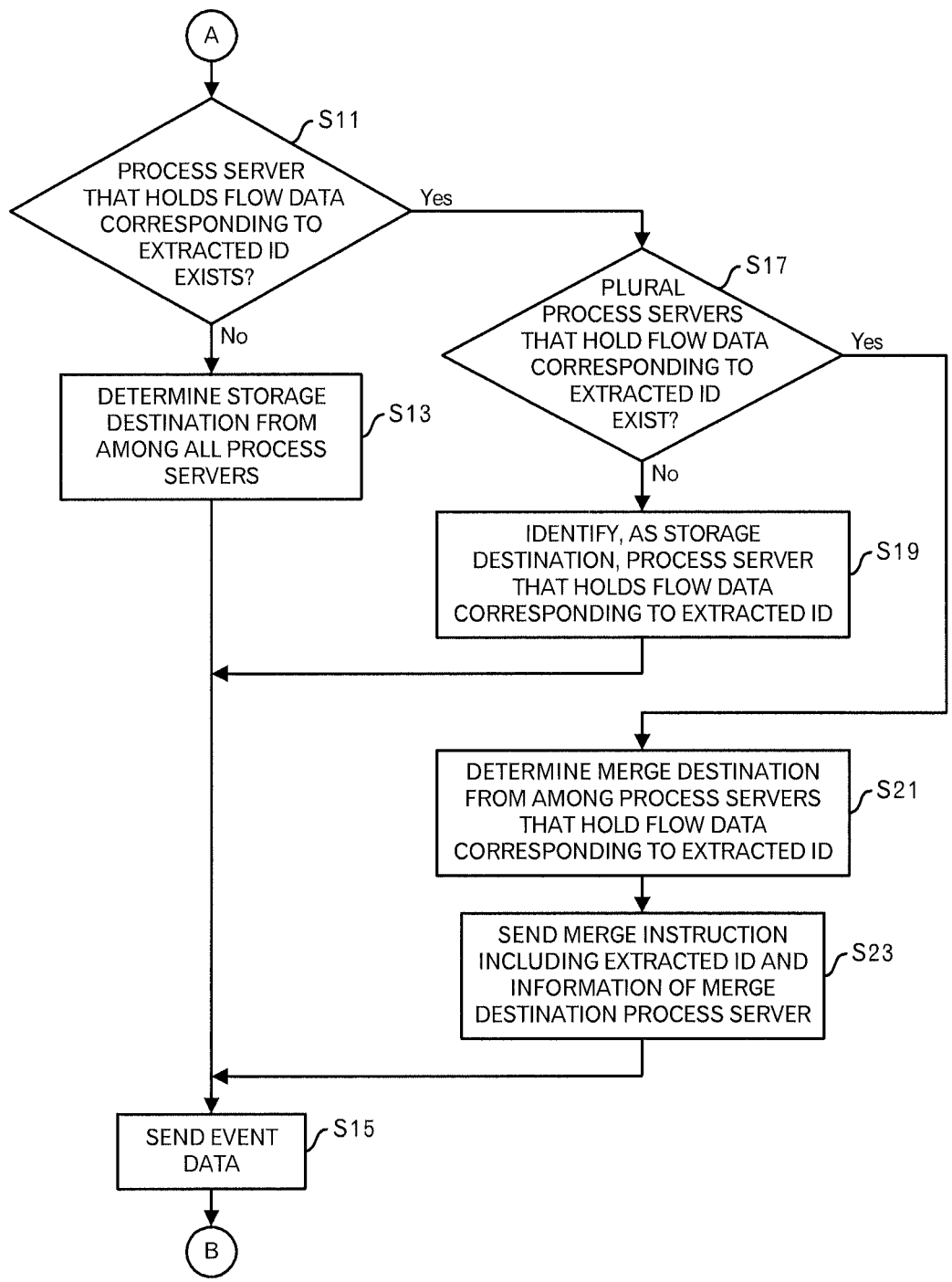
FIG. 20 is a diagram depicting the processing flow of the master server.
Figure 21:
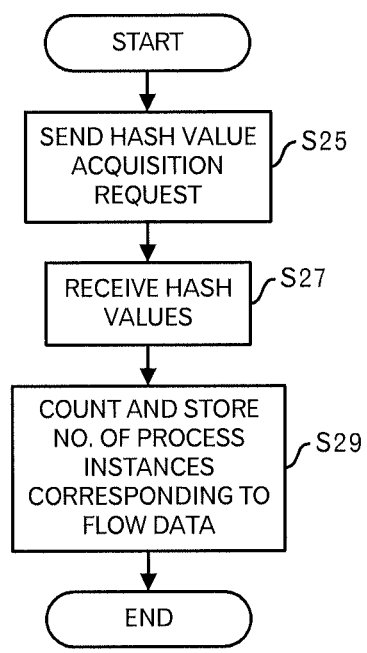
FIG. 21 is a diagram depicting the processing flow of the master server.
Figure 22:
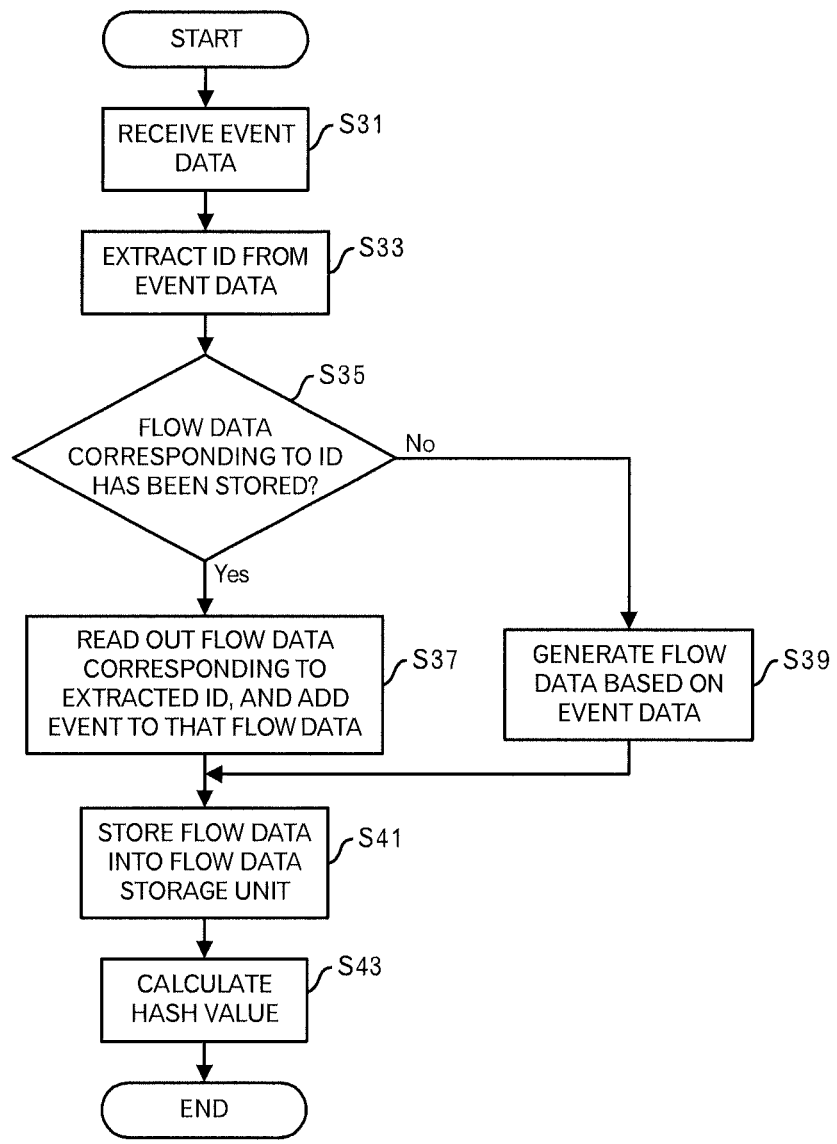
FIG. 22 is a diagram depicting the processing flow of the master server.

Next, FIG. 19 to FIG. 26 will be used to explain, in more detail, the processing of the master server 3 and process servers 5 to carry out the processing explained above. FIG. 19 and FIG. 21 depict the processing flow by the master server 3. First, a processing when extracting the event data will be explained using FIG. 19 and FIG. 20. Incidentally, the master server 3 carries out the processing as depicted in FIG. 19 and FIG. 20 periodically or at arbitrary timing.

First, the event data extractor 33 judges whether or not unprocessed event data is stored in the event data storage unit 31 (FIG. 19: step S1). When there is no unprocessed event data stored in the event data storage unit 31 (step 51: NO route), the processing ends. On the other hand, when there is unprocessed event data stored in the event data storage unit 31 (step 51: YES route), the event data extractor 33 extracts the unprocessed event data from the event data storage unit 31 (step S3). Then, the event data extractor 33 extracts an ID from the event data (step S5). Moreover, the inquiry unit 35 transmits a flow data inquiry request that includes the extracted ID to each process server 5 (step S7).

After that, the inquiry unit 35 receives replies from the process servers 5 and judges whether or not the replies have been received from all of the process servers 5 (step S9). When a reply has not yet been received from any process server 5 (step S9: NO route), a processing returns to the step S9 and waits for the reply from the process server 5. On the other hand, when the replies have been received from all of the process servers 5 (step S9: YES route), a processing shifts to step S11 (FIG. 20) via a terminal A. For example, when a certain process server 5 is temporarily unusable, no reply is transmitted from that process server 5. Therefore, even though a reply has not yet been received from any process server 5, the processing shifts to the step S11 (FIG. 20) via the terminal A after a predetermined period of time has elapsed.

Shifting to explanation of FIG. 20, after the terminal A, the storage destination determination unit 37 judges whether or not there is a process server 5 that stores the flow data corresponding to the extracted ID (FIG. 20: step S11). When there is no process server 5 that stores the flow data corresponding to the extracted ID (step S11: NO route), the storage destination determination unit 37 determines a storage destination from among all of the process servers 5 (step S13). For example, by storing, in memory, the process server 5 that was the previous storage destination, the storage destination may be changed in order, or the amount of data of the flow data storage unit 55 may be returned with the reply to the inquiry, and the process server 5 that has the least amount of data may be determined as the storage destination. Incidentally, any other method may be employed as long as the flow data can be suitably dispersed. Then, the storage destination determination unit 37 transmits the extracted event data to the process server 5 that is determined as the storage destination (step S15). After that, the processing returns to the step S1 (FIG. 19) via a terminal B.

On the other hand, at the step S11, when it is determined that there is a process server 5 that holds the flow data corresponding to the extracted ID (step S11: YES route), the storage destination determination unit 37 judges whether or not there are plural process servers 5 that hold the flow data corresponding to the extracted ID (step S17). When there is one process server 5 the holds the flow data corresponding to the extracted ID (step S17: NO route), the storage destination determination unit 37 determines the process server 5 that holds the flow data corresponding to the extracted ID as the storage destination (step S19). After that, the processing shifts to the step S15 and the master server 3 transmits the extracted event data to the process server 5 that is the storage destination.

On the other hand, when it is judged at the step S17 that there are plural process servers 5 that hold the flow data corresponding to the extracted ID (step S17: YES route), the storage destination determination unit 37 determines a merge destination from among the process servers 5 that hold the flow data corresponding to the extracted ID (step S21). For example, the process servers 5 may reply with the data amount of the flow data storage unit 55 together with a reply to the inquiry, and the storage destination determination unit 37 may determines the process server 5 having the least amount of data as the merge destination. Any other method may also be used as long as it can suitably distribute the flow data. Moreover, the storage destination determination unit 37 transmits a flow data merge instruction that includes the extracted ID and information about the process server 5 that is the merge destination to the process servers 5 that hold the flow data corresponding to the extracted ID (step S23). After that, the processing moves to the step S15 and the master server 3 transmits the extracted event data to the process server that is the storage destination (i.e. merge destination).

Next, a processing associated with the totaling will be explained using FIG. 21. The master server 3 carries out the processing as depicted in FIG. 21 periodically or at arbitrary timing. First, the inquiry unit 35 transmits a hash value acquisition request to each process server 5 (FIG. 21: step S25). Then, the inquiry unit 35 receives hash values from the respective process servers 5 (step S27). After that, for each identical hash value, the inquiry unit 35 counts and totals the number of process instances corresponding to the flow data relating to that hash value and stores the totalling result into a storage device (step S29). The totalling result is outputted to the user as necessary.

The processing flow of the process server 5 is depicted in FIGS. 22 to 26. First, a processing when receiving the event data from the master server 3 will be explained using FIG. 22. The event data receiver 51 receives the event data from the master server 3 (FIG. 22: step S31), and temporarily stores the received data into a storage device. Then, the flow data processing unit 53 extracts an ID from the event data (step S33). Then, the flow data processing unit 53 judges whether or not the flow data corresponding to the extracted ID is stored in the flow data storage unit 55 (step S35). When the flow data corresponding to the extracted ID is stored (step S35: YES route), the flow data processing unit 53 reads out the flow data corresponding to the extracted ID and adds the transaction event of the received event data to the read flow data (step S37). On the other hand, when there is no flow data corresponding to the extracted ID stored in the flow data storage unit 55 (step S35: NO route), the flow data processing unit 53 generates new flow data that includes the transaction event of the received event data (step S39). Then, after the processing of the step S37 or step S39, the flow data processing unit 53 stores the flow data into the flow data storage unit 55 (step S41). More specifically, the flow data processing unit 53 stores the flow data after the transaction event has been added at the step S37, or the flow data that was generated at the step S39. In addition, the flow data processing unit 53 also calculates a hash value from that flow data (step S43), then stores that hash value in association with the flow data. After that, the processing ends.

Figure 23:
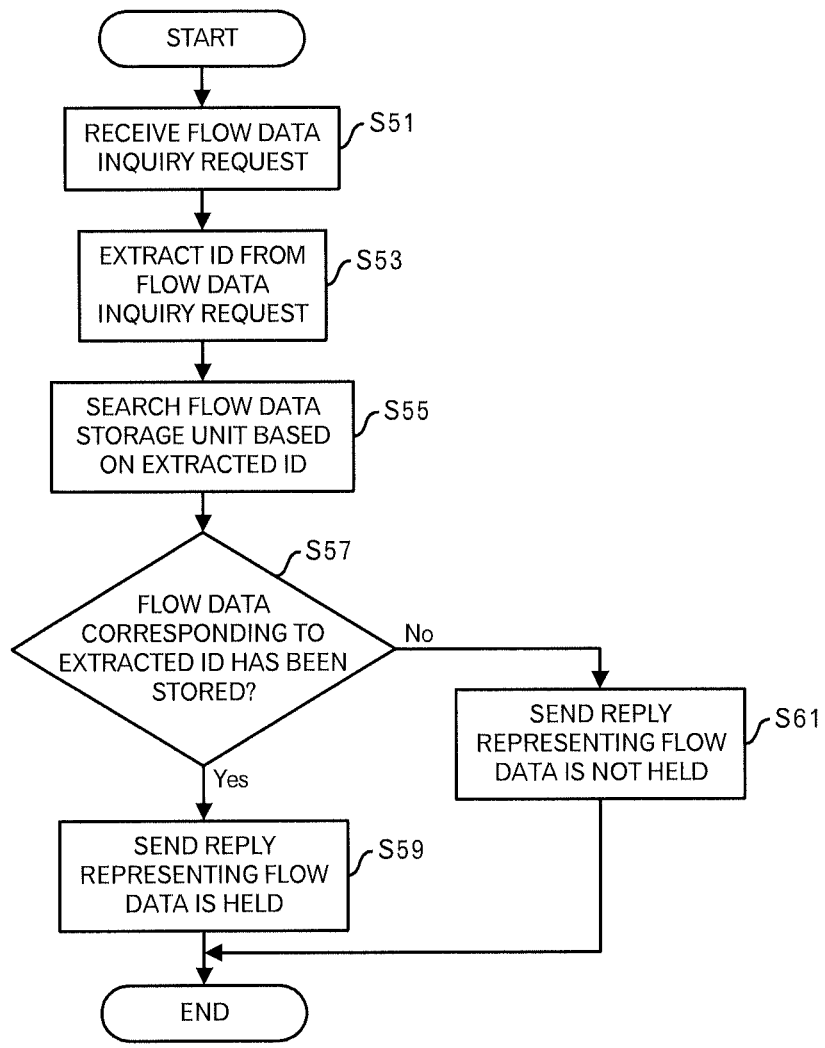
FIG. 23 is a diagram depicting the processing flow of the master server.

Next, a processing when a flow data inquiry request is received from the master server 3 is explained using FIG. 23. The flow data processing unit 53 receives a flow data inquiry request from the master server (FIG. 23: step S51), and extracts an ID from the flow data inquiry request (step S53). Then, the flow data processing unit 53 also searches the flow data storage unit 55 based on the extracted ID (step S55), and judges whether the flow data corresponding to the extracted ID is stored (step S57). When the flow data corresponding to the extracted ID is stored (step S57: YES route), the flow data processing unit 53 transmits a reply to the master server 3 indicating that flow data is held (step S59). On the other hand, when the flow data corresponding to the extracted ID is not stored (step S57: NO route), the flow data processing unit 53 transmits a reply to the master server indicating that flow data is not held (step S61). The processing then ends.

Figure 24:
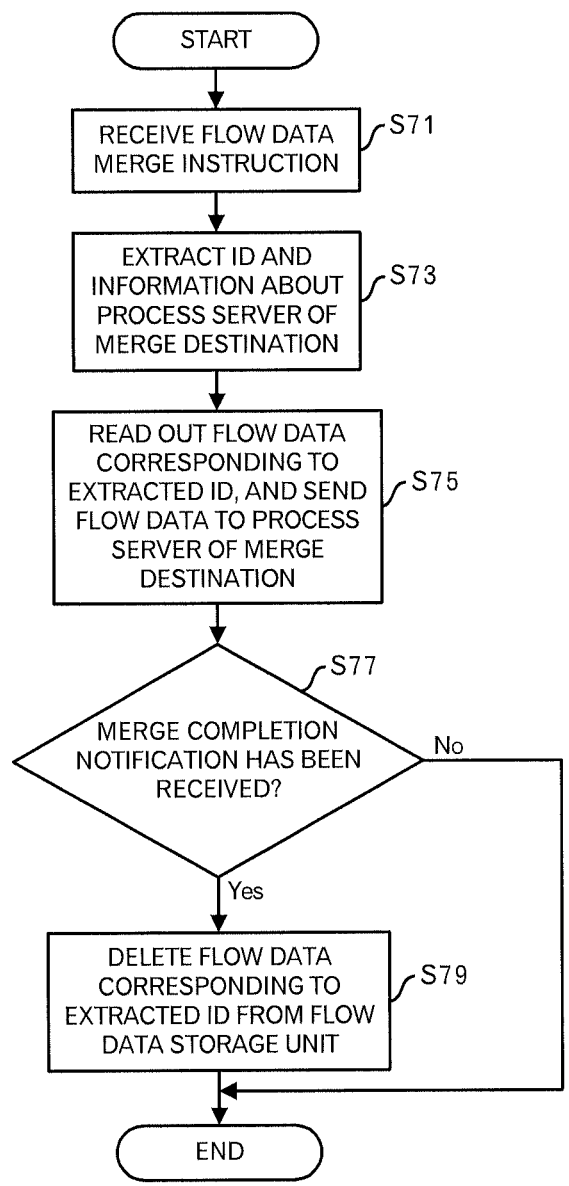
FIG. 24 is a diagram depicting a processing flow of a process server.

Next, a processing when a flow data merge instruction is received from the master server 3 is explained using FIG. 24. The merge processing unit 57 receives the flow data merge instruction from the master server 3 (FIG. 24: step S71), and extracts an ID and information about the process server 5 that is the merge destination from the flow data merge instruction (step S73). Incidentally, although it is not illustrated in the figure, when the process server 5 itself is specified as the merge destination, the following processing is skipped and processing ends. Moreover, the merge processing unit 57 reads out the flow data corresponding to the extracted ID from the flow data storage unit 55, and transmits the read flow data to the process server 5 that is the merge destination (step S75). Instead of transmitting the flow data, the merge processing unit 57 may transmit event data that was used for generating the flow data. After that, the merge processing unit 57 waits to receive a merge completion notification from the process server 5 that is the merge destination. When receiving the merge completion notification from the process server 5 that is the merge destination (step S77: YES route), the merge processing unit 57 deletes the flow data corresponding to the extracted ID from the flow data storage unit 55 (step S79). After that, processing ends.

On the other hand, when the merge completion notification has not been received from the process server 5 that is the merge destination after a predetermined amount of time has elapsed, or when an error notification is received from the process server 5 that is the merge destination (step S77: NO route), the processing of the step S79 is skipped, and the processing ends. In other words, when merging is not made for some reasons, the read flow data is not deleted from the flow data storage unit 55.

Figure 25:
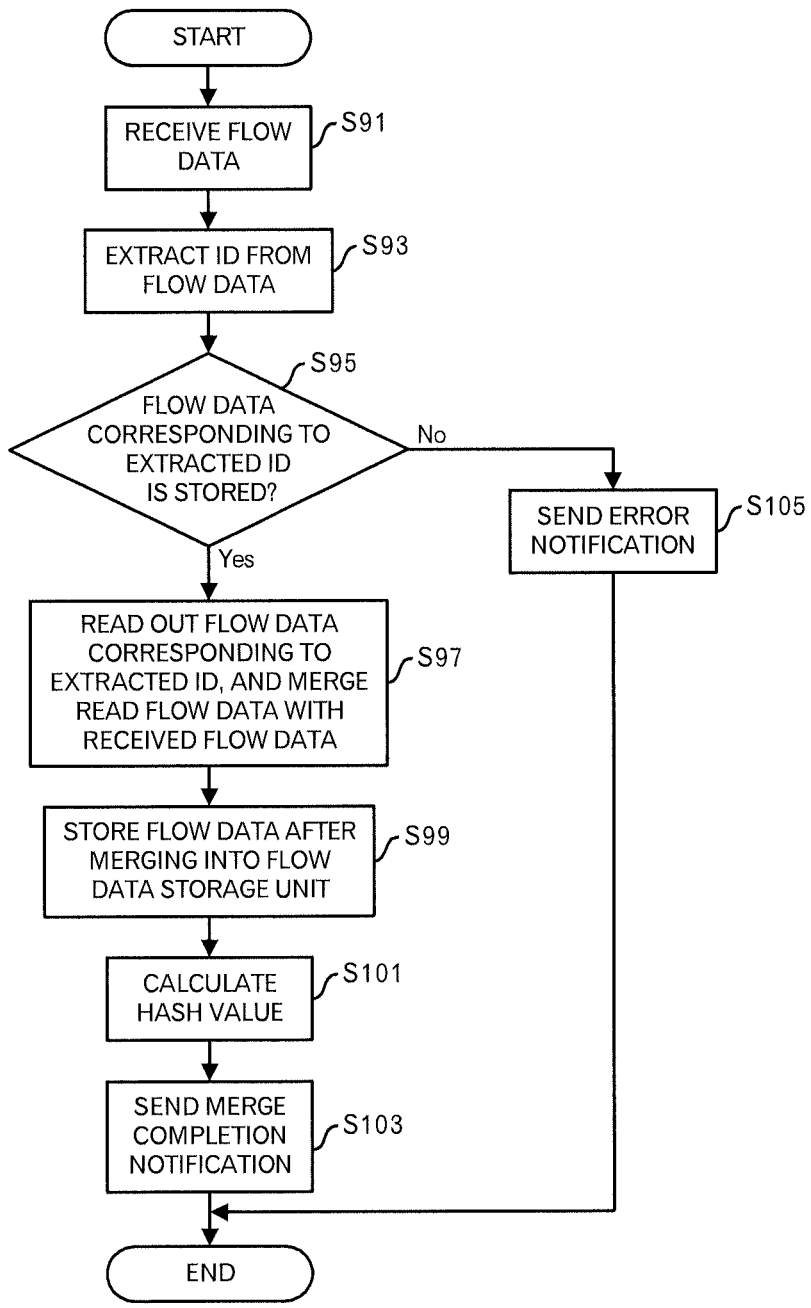
FIG. 25 is a diagram depicting the processing flow of the process server.

Next, a processing when the flow data (or event data) is received from another process server 5 is explained using FIG. 25. The merge processing unit 57 receives the flow data (or event data) from another process server 5 (FIG. 25: step S91), and temporarily stores the received data in a storage device. Moreover, the merge processing unit 57 also extracts an ID from the flow data (step S93). Then, the merge processing unit 57 judges whether or not the flow data corresponding to the extracted ID is stored in the flow data storage unit 55 (step S95). When the flow data corresponding to the extracted ID is stored in the flow data storage unit 55 (step S95: YES route), the merge processing unit 57 reads out the flow data corresponding to the extracted ID from the flow data storage unit 55 and merges the read flow data with the received flow data (step S97). More specifically, the merge processing unit 57 adds the transaction event of the event data that is included in the flow data from another process server 5 to its own flow data according to the processing date and time. Then, the merge processing unit 57 stores the flow data after merging into the flow data storage unit 55 (step S99). In addition, the flow data processing unit 53 calculates a hash value from the merged flow data (step S101), then stores that hash value in association with the flow data after the merging. Then, the merge processing unit 57 transmits a merge completion notification to the transmission source of the flow data (step S103). After that, the processing ends.

On the other hand, when it is judged at the step S95 that there is no flow data corresponding to the extracted ID stored in the flow data storage unit 55 (step S95: NO route), the merge processing unit 57 transmits an error notification to the transmission source of the flow data because there is no flow data to be merged (step S105). The processing then ends.

Figure 26:
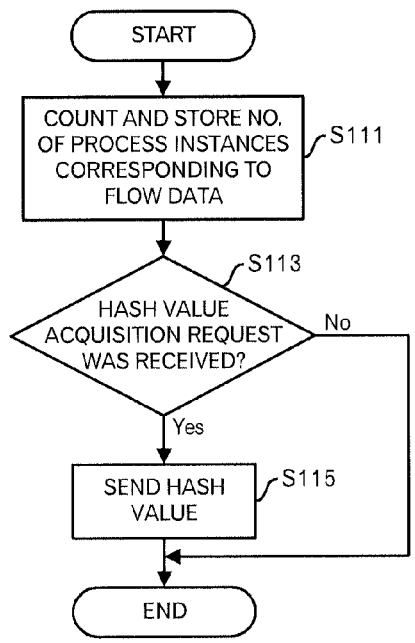
FIG. 26 is a diagram depicting the processing flow of the process server.

Next, a processing relating to the totalling is explained using FIG. 26. Incidentally, the process server 5 carries out a processing as illustrated in FIG. 26 periodically or at arbitrary timing. The flow data processing unit 53 reads out the stored hash values that correspond to flow data, and counts, for each identical hash value, the number of process instances corresponding to the flow data that corresponds to that hash value, and stores the totalled results into a storage device (FIG. 26: step S111). In addition, the flow data processing unit 53 judges whether or not a hash value acquisition request has been received from the master server 3 (step S113). When the hash value acquisition request has been received (step S113: YES route), the flow data processing unit 53 reads out the stored hash values stored in association with the flow data, and transmits the hash values to the master server 3 (step S115). After that, the processing ends. On the other hand, when a hash acquisition request is not received (step S113: NO route), the processing skips the step S115 and ends.

By carrying out the processing described above, even when transaction events having the same ID are dispersed among plural process servers 5 for some reasons, it is possible to automatically merge the flow data after that situation, and as a result, it is possible to distributedly generate complete process instances by using each of plural process servers 5. Moreover, it is possible to obtain correct totalled results.

An embodiment of the present technique was explained above, however, the present technique is not limited to this. For example, the functional block diagrams of the master server 3 and process servers 5 explained above do not always correspond to actual program module configurations. Moreover, in the processing flow as well, it is possible to change the processing order as long as the processing results are not changed. Furthermore, the processing may be carried out in parallel.

The method for determining the storage destination and merge destination is also not limited to the method described above. For example, a reply to an inquiry may be delayed according to the amount of data in the flow data storage unit 55, and the process server 5 whose reply was returned the quickest may be determined as the storage destination or merge destination. In addition, for example, the IDs of the event data that have been allocated in the past to each of the process servers 5 may be stored in the master server 3, and the process server 5 to which event data has been allocated the least may be determined as the storage destination or merge destination. Furthermore, for example, as long as it is within a predetermined period since the previous merge instruction was transmitted, the process servers 5 that are the merge source and merge destination relating to the merge instruction are currently being used in a merge processing, so may be removed as candidates for the storage destination or merge destination.

In the explanation above, the inquiry about the holding status of the flow data is sent after the event data was extracted. However, for example, when there is a process server 5, which is temporarily unusable, the master server 3 may store the ID of the event data that has been allocated until that process server 5 recovers, and after the recovery, the master server 3 may make an inquiry of that process server for the holding status of the flow data relating to the stored ID.

Moreover, in the aforementioned explanation, the process servers 5 transmit hash values to the master server 3, however, instead of hash values, the totaled number of process instances corresponding to the flow data at the step S111 may be transmitted to the master server 3. In such a case, the master server 3 may sum the number of process instances corresponding to the flow data from each of the process servers 5 to calculate the overall accumulated totaled number.

The aforementioned embodiments are outlined as follows:

This business flow distributed processing system has plural process server, each having means for generating a process instance that a series of transaction events are arranged in a time series; and a master server that sequentially reads out event data regarding a transaction event and including an event name, a processing time and an identifier to identify the process instance, from an event data storage unit, and allocates the event data to any one of the plural process servers. Then, the aforementioned master server has means for outputting an inquiry of a holding state of a process instance corresponding to an identifier included in the event data read out from the event data storage unit to the plural process servers; means for receiving a response for the inquiry from the plural process server and judging whether or not plural first process servers holding the process instance relating to the inquiry exist; means for determining a second process server that is a merge destination of the process instance relating to the inquiry, from among the plural first process servers when the plural first process servers exist; and means for outputting a merge instruction including information of the second process server and the identifier of the process instance relating to the inquiry to the first process servers. Furthermore, each of the aforementioned plural process servers has a process instance data storage unit storing the process instance including the event data in association with the identifier of the process instance; means, in response to the inquiry from the master server, for searching the process instance data storage unit for the identifier relating to the inquiry, and replying with presence or absence of the process instance relating to the inquiry to the master server; means for outputting event data relating to the identifier included in the merge instruction to the second process server relating to the merge instruction, when the merge instruction from the master server is received and the process server itself is one of the first process servers other than the second process server; and merge means, in response to receipt of event data from another process server, for merging the received event data to the process instance, which corresponds to the same identifier as the received event data and is stored in the process instance data storage unit.

Thus, even when the transaction events having the same ID are distributed to plural process servers for some reasons, it is possible to automatically merge the flow data, and the respective process servers can generate complete process instances.

In addition, the merge means may comprise means for outputting a merge completion notification to a transmission source of the received event data. Furthermore, each of the plural process servers further may comprise means, in response to receipt of the merge completion notification, for deleting the process instance corresponding to the merge instruction from the process instance data storage unit.

Thus, because the process instance is not deleted in the process servers of the merge source until the merge is completed, the lack of the merge can be reduced.

Furthermore, each of the aforementioned plural process servers may further comprise means for calculating a hash value for each of the process instances stored in the process instance data storage unit and storing the hash value into a storage device.

In addition, each of the aforementioned plural process servers may further comprise means for counting, for each identical hash value, the number of process instances relating to the hash value.

In addition, the aforementioned master server may further comprise means for obtaining the hash value from each of the plurality of process servers and counting the number of process instances relating to the hash value, for each identical hash value.

Incidentally, this business flow distributed processing system may be realized by a program causing a hardware to execute the aforementioned processing, and the program is stored into a computer-readable storage medium or storage device such as a flexible disk, CD-ROM, magneto-optical disk, a semiconductor memory, or hard disk. Incidentally, data during the processing is temporarily stored into a storage device such as a memory of the computer.

Figure 27:
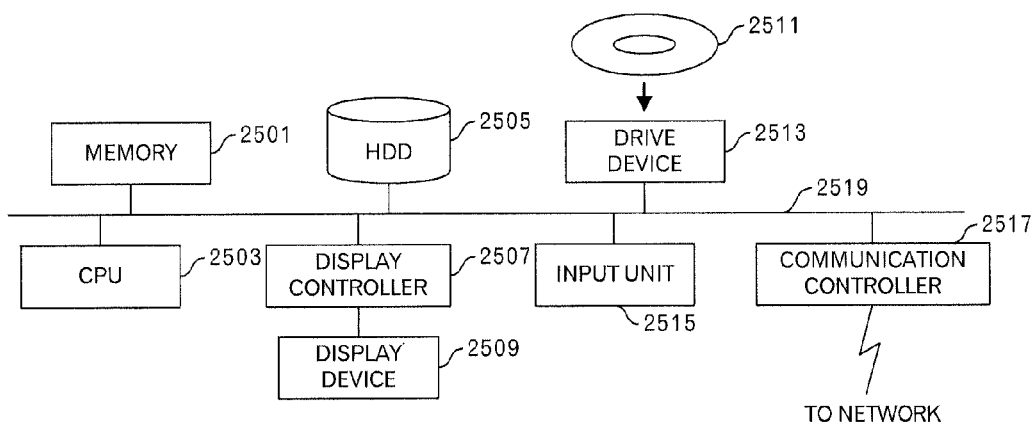
FIG. 27 is a functional block diagram for a computer.

In addition, the master server 3 and the process servers 5 are computer device as shown in FIG. 27. That is, a memory 2501 (storage device), a CPU 2503 (processor), a hard disk drive (HDD) 2505, a display controller 2507 connected to a display device 2509, a drive device 2513 for a removable disk 2511, an input device 2515, and a communication controller 2517 for connection with a network are connected through a bus 2519 as shown in FIG. 27. An operating system (OS) and an application program for carrying out the foregoing processing in the embodiment, are stored in the HDD 2505, and when executed by the CPU 2503, they are read out from the HDD 2505 to the memory 2501. As the need arises, the CPU 2503 controls the display controller 2507, the communication controller 2517, and the drive device 2513, and causes them to perform necessary operations. Besides, intermediate processing data is stored in the memory 2501, and if necessary, it is stored in the HDD 2505. In this embodiment of this invention, the application program to realize the aforementioned functions is stored in the removable disk 2511 and distributed, and then it is installed into the HDD 2505 from the drive device 2513. It may be installed into the HDD 2505 via the network such as the Internet and the communication controller 2517. In the computer as stated above, the hardware such as the CPU 2503 and the memory 2501, the OS and the necessary application programs systematically cooperate with each other, so that various functions as described above in details are realized.

What is claimed is:

1. A business flow distributed processing system, comprising:
   a plurality of process servers, each having a generator that generates a process instance that a series of transaction events are arranged in a time sequence; and
   a master server that reads out event data regarding a transaction event and including an event name, a processing time and an identifier to identify the process instance, from an event data storage unit, and allocates the event data to any one of the plurality of process servers, and
   wherein the master server:
   outputs an inquiry of a holding state of a process instance corresponding to an identifier included in the event data read out from the event data storage unit to the plurality of process servers,
   receives a response for the inquiry from the plurality of process servers and judge whether a plurality of first process servers holding the process instance relating to the inquiry exist,
   determines a second process server that is a merge destination of the process instance relating to the inquiry, from among the plurality of first process servers when the plurality of first process servers exist, and
   outputs a merge instruction including information of the second process server and the identifier of the process instance relating to the inquiry to the first process servers, and
   wherein each of the plurality of process servers comprises:
   a process instance data storage unit storing the process instance including the event data in association with the identifier of the process instance, and
   in response to the inquiry from the master server, each of the plurality of process servers searches the process instance data storage unit for the identifier relating to the inquiry, and replies with presence or absence of the process instance relating to the inquiry to the master server,
   outputs event data relating to the identifier included in the merge instruction to the second process server relating to the merge instruction, when the merge instruction from the master server is received and the process server itself is one of the first process servers other than the second process server, and
   in response to receipt of event data from another process server, each of the plurality of process servers merges the received event data to the process instance, which corresponds to the same identifier as the received event data and is stored in the process instance data storage unit.

2. The business flow distributed processing system as set forth in claim 1, wherein each of the plurality of process servers outputs a merge completion notification to a transmission source of the received event data, and in response to receipt of the merge completion notification, each of the plurality of process servers deletes the process instance corresponding to the merge instruction from the process instance data storage unit.

3. The business flow distributed processing system as set forth in claim 1, wherein each of the plurality of process servers calculates a hash value for each of the process instances stored in the process instance data storage unit and to stores the hash value into a storage device.

4. The business flow distributed processing system as set forth in claim 3, wherein each of the plurality of process servers counts, for each identical hash value, the number of process instances relating to the hash value.

5. The business flow distributed processing system as set forth in claim 3, wherein the master server obtains the hash value from each of the plurality of process servers and counts the number of process instances relating to the hash value, for each identical hash value.

6. A business flow distributed processing method executed by a system,
wherein the system comprises a plurality of process servers, each having a process instance data storage unit storing a process instance that a series of transaction events are arranged in a time sequence in association with an identifier to identify the process instance; and a master server that reads out event data regarding a transaction event and including an event name, a processing time and the identifier, from an event data storage unit, and allocates the event data to any one of the plurality of process servers, and
wherein the business flow distributed processing method comprises:
outputting, by the master server, an inquiry of a holding state of a process instance corresponding to an identifier included in the event data read out from the event data storage unit to the plurality of process servers;
in response to receipt of the inquiry from the master server, searching, by each of the plurality of process servers, the process instance data storage unit for the identifier relating to the inquiry, and replying with presence or absence of the process instance relating to the inquiry to the master server;
receiving, by the master server, a response for the inquiry from the plurality of process servers and judging whether a plurality of first process servers holding the process instance relating to the inquiry exist;
determining, by the master server, a second process server that is a merge destination of the process instance relating to the inquiry, from among the plurality of first process servers when the plurality of first process servers exist;
outputting, by the master server, a merge instruction including information of the second process server and the identifier of the process instance relating to the inquiry to the first process servers;
outputting, by each of the plurality of process servers, event data relating to the identifier included in the merge instruction to the second process server relating to the merge instruction, when the merge instruction from the master server is received and the process server itself is one of the first process servers other than the second process server; and
in response to receipt of event data from another process server, merging, by each of the plurality of process server, the received event data to the process instance, which corresponds to the same identifier as the received event data and is stored in the process instance data storage unit.

* * * * *

UNITED STATES PATENT AND TRADEMARK OFFICE
CERTIFICATE OF CORRECTION

PATENT NO. : 8,583,754 B2
APPLICATION NO. : 13/023118
DATED : November 12, 2013
INVENTOR(S) : Yoshihide Nomura It is certified that error appears in the above-identified patent and that said Letters Patent is hereby corrected as shown below:

In the Claims

In Column 15, Line 9, In Claim 3, before "stores" delete "to".

Signed and Sealed this
Twenty-fifth Day of March, 2014

Michelle K. Lee
*Deputy Director of the United States Patent and Trademark Office*